(12) United States Patent
Honjo et al.

(10) Patent No.: US 8,608,874 B2
(45) Date of Patent: Dec. 17, 2013

(54) SPRING STEEL AND METHOD FOR MANUFACTURING THE SAME

(75) Inventors: Minoru Honjo, Tokyo (JP); Kazukuni Hase, Tokyo (JP); Hideto Kimura, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 13/638,375

(22) PCT Filed: Feb. 28, 2011

(86) PCT No.: PCT/JP2011/001156
§ 371 (c)(1),
(2), (4) Date: Nov. 8, 2012

(87) PCT Pub. No.: WO2011/121887
PCT Pub. Date: Oct. 6, 2011

(65) Prior Publication Data
US 2013/0048158 A1    Feb. 28, 2013

(30) Foreign Application Priority Data

Mar. 29, 2010  (JP) .................. 2010-076315
Apr. 28, 2010  (JP) .................. 2010-104536
Jan. 31, 2011  (JP) .................. 2011-019206

(51) Int. Cl.
C22C 38/22   (2006.01)
C22C 38/04   (2006.01)
C21D 9/02    (2006.01)

(52) U.S. Cl.
USPC .......... 148/334; 148/333; 148/335; 148/908; 148/580; 420/105

(58) Field of Classification Search
USPC .......... 420/105–111; 148/333, 334, 335, 580, 148/660, 663, 908
See application file for complete search history.

(56) References Cited

U.S. PATENT DOCUMENTS 5,009,843 A * 4/1991 Sugimoto et al. ............. 420/112
7,258,756 B2 * 8/2007 Nagao et al. .................. 148/595
(Continued)

FOREIGN PATENT DOCUMENTS

JP   A-10-196697    7/1998
JP   B2-2932943     8/1999
(Continued)

OTHER PUBLICATIONS

Apr. 9, 2013 Notice of Preliminary Rejection issued in Korean Application No. 10-2012-7028210 (with translation).

(Continued)

Primary Examiner — Deborah Yee
(74) Attorney, Agent, or Firm — Oliff & Berridge, PLC

(57) ABSTRACT

Disclosed is high strength spring steel that can limit the depth of pitting occurring when corroded and therefore possesses high strength as well as excellent pitting corrosion resistance and corrosion fatigue property, with a composition containing: C: greater than 0.35 mass % and less than 0.50 mass %; Si: greater than 1.75 mass % and less than or equal to 3.00 mass %; Mn: 0.2 mass % to 1.0 mass %; Cr: 0.01 mass % to 0.04 mass %; P: 0.025 mass % or less; S: 0.025 mass % or less; Mo: 0.1 mass % to 1.0 mass %; and 0: 0.0015 mass % or less, under a condition that a PC value calculated by PC=4.2×([C]+[Mn])+0.1×(1/[Si]+1/[Mo])+20.3×[Cr]+0.001×(1/[N]) is greater than 3.3 and equal to or less than 8.0. Also disclosed is a preferred method for manufacturing the same.

12 Claims, 4 Drawing Sheets

(56) References Cited

U.S. PATENT DOCUMENTS

| | | | |
|---|---|---|---|
| 7,618,498 B2 * | 11/2009 | Kochi et al. | 148/328 |
| 8,043,444 B2 * | 10/2011 | Yoshihara | 148/333 |
| 2006/0169367 A1 | 8/2006 | Yuse et al. | |
| 2010/0224287 A1 | 9/2010 | Kochi et al. | |
| 2011/0074076 A1 * | 3/2011 | Kuno et al. | 267/166 |

FOREIGN PATENT DOCUMENTS

| | | |
|---|---|---|
| JP | A-2001-288530 | 10/2001 |
| JP | A-2005-023404 | 1/2005 |
| JP | B2-3896902 | 3/2007 |
| JP | A-2007-100209 | 4/2007 |
| JP | A-2007-191776 | 8/2007 |
| JP | A-2008-106365 | 5/2008 |
| JP | A-2009-046764 | 3/2009 |
| JP | B2-4280123 | 6/2009 |
| JP | A-2009-256771 | 11/2009 |

OTHER PUBLICATIONS

May 31, 2011 Search Report issued in International Application No. PCT/JP2011/001156.

* cited by examiner

SPRING STEEL AND METHOD FOR MANUFACTURING THE SAME

BACKGROUND OF THE INVENTION

1. Field of the Invention

The present invention relates to high strength spring steel that is used as the material of, for example, suspension springs, torsion bars and stabilizers for automobiles, and in particular, to high strength spring steel that possesses high strength as well as excellent pitting corrosion resistance and corrosion fatigue property and that is preferably used as chassis underbody members of automobiles, and a method for manufacturing the same.

2. Description of Related Art

From the viewpoint of recent global environmental issues, there are demands for improving fuel efficiency of automobiles and reducing carbon dioxide emission, and therefore an increasingly high demand for reducing weight of automobiles. Particularly, there is a strong demand for reducing weight of suspension springs that are chassis underbody members of automobiles, whereby high stress design is applied to these suspension springs by using as a material thereof a strengthened material having a post quenching-tempering strength of 2000 MPa or more.

General-purpose spring steel has a post quenching-tempering strength of about 1600 to 1800 MPa, as prescribed in JIS G4801. Such spring steel is manufactured into a predetermined wire rod by hot rolling and the wire rod is thermally formed into a spring-like shape and subjected to quenching-tempering processes in a case of a hot formed spring. Alternatively, the spring steel is subjected to drawing, quenching-tempering processes and then formed into a spring-like shape in a case of a cold formed spring.

For example, the materials commonly used for suspension springs include SUP7 described in JIS G4801. When SUP7 is strengthened, corrosion fatigue property (corrosion fatigue resistance) thereof after corrosion deteriorate, although fatigue properties thereof in the atmosphere improve, thereby eventually causing a problem of deterioration in corrosion fatigue property. In view of this, the current upper limit of actually applicable hardness of SUP7 is a level of 51 HRC and the upper limit of design stress thereof is 1100 MPa, inhibiting further enhancement of SUPT strength.

A material that is strengthened so as to have a strength of 1900 MPa or more after quenching-tempering processes has higher crack sensitivity. Accordingly, if a component that is exposed to the exterior, such as a suspension spring as a chassis underbody member of an automobile, is made of such a material as described above and has poor pitting corrosion resistance, there is a concern that corrosion pits may be formed at those portions where the coating has come off due to pebbles and that the chassis underbody member may be damaged due to the propagation of fatigue cracks starting from the corrosion pits.

In view of the foregoing, some solutions have been proposed to address these problems. JP-B-2932943 discloses that, by controlling the chemical composition and the value of FP (see Formula (1a) below) to be between 2.5 and 4.5, no supercooling structure occurs in the structure after rolling, the strength after rolling is suppressed to be 1350 MPa or less at which cold working is facilitated, and uniform and sufficient hardening is obtained by the subsequent quenching and tempering, which makes it possible to obtain the strength after quenching and tempering being 1900 MPa or more. However, JP-B-2932943 is based on the addition of an alloy element for improving corrosion resistance and controllably setting the value of FP to be between 2.5 and 4.5 does not necessarily ensure provision of a high strength spring steel that possesses good pitting corrosion resistance and corrosion fatigue property.

$$FP=(0.23[C]+0.1)\times(0.7[Si]+1)\times(3.5[Mn]+1)\times(2.2[Cr]+1)\times(0.4[Ni]+1)\times(3[Mo]+1) \quad \text{Formula (1a)}$$

wherein [brackets] denote the content of each element in the brackets (in mass %).

JP-A 10-196697 discloses spring steel that is obtained by covering at least a part of the surface of a spring steel base material with a corrosion protective film functioning as a sacrifice anode, wherein carbonitride forming elements are added to the spring steel base material so that carbonitride is micro-dispersed in the spring steel basic material. In JP-A 10-196697, there is used as a corrosion protective film either a metal film that is composed of metal/alloy having electrochemically lower potential than the spring steel basic material or a composite film in which many metals/alloys of the metals having electrochemically lower potential than the spring steel basic material are dispersed in a non-metal film. This, however, leads to an increase in manufacturing cost due to the need for performing a step of forming a corrosion protective film on the spring steel. It is also believed that if the corrosion protective film comes off due to pebbles and the like, corrosion pits are formed and deteriorate corrosion fatigue property.

JP-B 3896902 discloses that C is to be reduced as the cause of a reduction in corrosion fatigue strength, that degradation in sag resistance that could be caused by the reduction in C is prevented by adding Si, and that the ratio of Si/C is important in this regard. However, there is a limit to reducing the amount of C, if reduction of carbon content effectively suppresses deterioration in the corrosion fatigue strength. Thus, simply setting a ratio of Si/C alone does not necessarily provide high strength spring steel that possesses both good pitting corrosion resistance and corrosion fatigue property.

Patent JP-B 4280123 discloses that reducing the content of Cr may suppress the amount of hydrogen generated at the tip of corrosion pits, therefore the amount of hydrogen penetrating into the steel and eventually the degree of hydrogen embrittlement. Patent JP-B 4280123 also discloses that if any hydrogen penetrates into the steel material, the degree of hydrogen embrittlement may be suppressed by trapping hydrogen by Ti and V, and therefore the corrosion fatigue resistance may be improved by balancing the contents of Cr, Ti and V appropriately. However, even if the degree of hydrogen embrittlement of the spring steel can be suppressed by only optimizing the contents of Cr, Ti and V, high strength spring steel that possesses good pitting corrosion resistance and corrosion fatigue property may not necessarily be obtained by such optimization.

JP-A 2008-106365 discloses that corrosion fatigue property may be improved by subjecting the steel to heat treatment to have a hardness of 50.5 to 55.0 HRC, followed by warm shot peening so that a residual stress of 600 MPa or more is generated at a depth of 0.2 mm below the surface. This, however, leads to an increase in manufacturing cost due to the need for performing a step of shot peening the spring steel. Further, while the provision of residual stress by shot peening is effective for suppressing the occurrence of surface cracks, it does not necessarily provide high strength spring steel that possesses both good pitting corrosion resistance and corrosion fatigue property.

JP-A 2009-046764 discloses spring steel that has excellent corrosion fatigue property by balancing appropriately the contents of C, Si, Mn, Cr, Ni and Cu from the viewpoint of the hardness of spring steel, the amounts of C, Cr, Ni and Cu from the viewpoint of the shape of pits, and the amounts of C, Si, Mn, Cr, Ni, Cu, Ti and Nb from the viewpoint of hydrogen embrittlement resistance. However, there is a limit on optimizing the shape of pits only by balancing the amounts of C, Cr, Ni and Cu.

SUMMARY OF THE INVENTION

Problems to be Solved by the Invention

As described above, further strengthening of suspension springs that are chassis underbody members of automobiles has been a task to be achieved in terms of improving fuel efficiency of automobiles and reducing carbon dioxide emission. However, since a material becomes susceptible to cracks as strength of the material increases, there has been a problem of poor resistance to corrosion fatigue damage of the material in a case where the material has poor pitting corrosion resistance.

The present invention is made to solve the aforementioned problem. An object of the present invention is to provide high strength spring steel that exhibits suppressed depth growth of pitting in steel corrosion and possesses high strength as well as excellent pitting corrosion resistance and corrosion fatigue property by optimizing contents of C, Si, Mn, Cr and Mo to be added to the conventional high strength spring steel, as well as a preferred method for manufacturing the same.

Means for Solving the Problems

To solve the aforementioned problems, the inventors manufactured high strength spring steel by changing contents of C, Si, Mn, Cr and Mo to be added and varying a PC value represented by Formula (1) below and also made a keen study on pitting corrosion resistance and corrosion fatigue resistance.

$$PC = 4.2 \times ([C]+[Mn]) + 0.1 \times (1/[Si]+1/[Mo]) + 20.3 \times [Cr] + 0.001 \times (1/[N]) \quad \text{Formula (1)}$$

wherein [brackets] denote the content of an element in the brackets (in mass %).

As a result, the inventors discovered that the pitting corrosion resistance and corrosion fatigue resistance of the material are improved by optimizing contents of C, Si, Mn, Cr and Mo to be added and also controlling the PC value to be within an appropriate range, thereby accomplishing the present invention. Primary features of the present invention are as follows:

[1] Spring steel comprising:
a chemical composition including,
C: greater than 0.35 mass % and less than 0.50 mass %,
Si: greater than 1.75 mass % and equal to or less than 3.00 mass %,
Mn: 0.2 mass % to 1.0 mass % (inclusive of 0.2 mass % and 1.0 mass %),
Cr: 0.01 mass % to 0.04 mass % (inclusive of 0.01 mass % and 0.04 mass %),
P: 0.025 mass % or less,
S: 0.025 mass % or less,
Mo: 0.1 mass % to 1.0 mass % (inclusive of 0.1 mass % and 1.0 mass %),
O: 0.0015 mass % or less, and
the balance as incidental impurities and Fe; and
microstructure with martensite fraction of 90% or more, wherein a PC value calculated by Formula (1) below is greater than 3.3 and equal to or less than 8.0, and the spring steel has tensile strength of 1900 MPa or more.

$$PC = 4.2 \times ([C]+[Mn]) + 0.1 \times (1/[Si]+1/[Mo]) + 20.3 \times [Cr] + 0.001 \times (1/[N]) \quad \text{Formula (1)}$$

wherein [brackets] denote the content of an element in the brackets (in mass %).

It should be noted that N is naturally contained in the spring steel as an incidental impurity by a content less than 0.005 mass % if the element is not intentionally added to the spring steel. Accordingly, the content (mass %) of N contained as an incidental impurity or, if N is added intentionally as described below, the content (mass %) of N after the intentional addition is used as the nitrogen content [N] of formula (1) above.

[2] The spring steel according to [1] above, wherein the chemical composition further satisfies Formula (2) below:

$$[Cr]/[Mo] \leq 0.35 \quad \text{Formula (2)}$$

wherein [brackets] denote the content of an element in the brackets (in mass %).

[3] The spring steel according to [1] or [2] above, wherein the chemical composition further contains at least one element selected from:
Al: 0.01 mass % to 0.50 mass % (inclusive of 0.01 mass % and 0.50 mass %);
Cu: 0.005 mass % to 1.0 mass % (inclusive of 0.005 mass % and 1.0 mass %); and
Ni: 0.005 mass % to 2.0 mass % (inclusive of 0.005 mass % and 2.0 mass %).

[4] The spring steel according to any of [1] to [3] above, wherein the chemical composition further contains at least one type of element selected from:
W: 0.001 mass % to 2.0 mass % (inclusive of 0.001 mass % and 2.0 mass %);
Nb: 0.001 mass % to 0.1 mass % (inclusive of 0.001 mass % and 0.1 mass %);
Ti: 0.001 mass % to 0.2 mass % (inclusive of 0.001 mass % and 0.2 mass %); and
V: 0.002 mass % to 0.5 mass % (inclusive of 0.002 mass % and 0.5 mass %).

[5] The spring steel according to any of [1] to [4] above, wherein the chemical composition further contains:
B: 0.0002 mass % to 0.005 mass % (inclusive of 0.0002 mass % and 0,005 mass %).

[6] The spring steel according to any of [1] to [5] above, wherein the chemical composition further contains:
N: 0.005 mass % to 0.020 mass % (inclusive of 0.005 mass % and 0.020 mass %).

[7] A method for manufacturing spring steel, comprising:
heating a steel material to temperature in the range of $Ac_3$ point to ($Ac_3$ point+200° C.) (inclusive of $Ac_3$ point and ($Ac_3$ point+200° C.));
cooling the steel material to 200° C. or lower at a cooling rate of 10° C./sec or higher; and
thereafter heating the steel material to temperature in the range of 150° C. and 500° C. (inclusive of 150° C. and 500° C.) and then cooling,
wherein the steel material has a chemical composition including,
C: greater than 0.35 mass % and less than 0.50 mass %,
Si: greater than 1.75 mass % and equal to or less than 3.00 mass %,
Mn: 0.2 mass % to 1.0 mass % (inclusive of 0.2 mass % and 1.0 mass %),
Cr: 0.01 mass % to 0.04 mass % (inclusive of 0.01 mass % and 0.04 mass %), P: 0.025 mass % or less,
S: 0.025 mass % or less,
Mo: 0.1 mass % to 1.0 mass % (inclusive of 0.1 mass % and 1.0 mass %),
O: 0.0015 mass % or less, and
the balance as incidental impurities and Fe, and
a PC value calculated by Formula (1) below is greater than 3.3 and equal to or less than 8.0.

PC=4.2×([C]+[Mn])+0.1×(1/[Si]+1/[Mo])+20.3× [Cr]+0.001×(1/[N])   Formula (1)

wherein [brackets] denote the content of an element in the brackets (in mass %).

[8] The method for manufacturing spring steel according to [7] above, wherein the chemical composition further satisfies Formula (2) below:

[Cr]/[Mo]≤0.35   Formula (2)

wherein [brackets] denote the content of an element in the brackets (in mass %).

[9] The method for manufacturing spring steel according to [7] or [8] above, the chemical composition further contains at least one type of element selected from:
Al: 0.01 mass % to 0.50 mass % (inclusive of 0.01 mass % and 0.50 mass %);
Cu: 0.005 mass % to 1.0 mass % (inclusive of 0.005 mass % and 1.0 mass %); and
Ni: 0.005 mass % to 2.0 mass % (inclusive of 0.005 mass % and 2.0 mass %).

[10] The method for manufacturing spring steel according to any of [7] to [9] above, wherein the chemical composition further contains at least one type of element selected from:
W: 0.001 mass % to 2.0 mass % (inclusive of 0.001 mass % and 2.0 mass %);
Nb: 0.001 mass % to 0.1 mass % (inclusive of 0.001 mass % and 0.1 mass %);
Ti: 0.001 mass % to 0.2 mass % (inclusive of 0.001 mass % and 0.2 mass %); and
V: 0.002 mass % to 0.5 mass % (inclusive of 0.002 mass % and 0.5 mass %).

[11] The method for manufacturing spring steel according to any of [7] to [10] above, wherein the chemical composition further contains:
B: 0.0002 mass % to 0.005 mass % (inclusive of 0.0002 mass % and 0.005 mass %).

[12] The method for manufacturing spring steel according to any of [7] to [11] above, wherein the chemical composition further contains:
N: 0.005 mass % to 0.020 mass % (inclusive of 0.005 mass % and 0.020 mass %).

That is, the spring steel of the present invention essentially has a chemical composition including, C: greater than 0.35 mass % and less than 0.50 mass %, Si: greater than 1.75 mass % and equal to or less than 3.00 mass %, Mn: 0.2 mass % to 1.0 mass % (inclusive of 0.2 mass % and 1.0 mass %), Cr: 0.01 mass % to 0.04 mass % (inclusive of 0.01 mass % and 0.04 mass %), P: 0.025 mass % or less, S: 0.025 mass % or less, Mo: 0.1 mass % to 1.0 mass % (inclusive of 0.1 mass % and 1.0 mass %), O: 0.0015 mass % or less, and the balance as incidental impurities and Fe, such that a PC value calculated by Formula (1) above is greater than 3.3 and equal to or less than 8.0.

Yet further, the chemical composition optionally contains at least one type of element selected from: Al: 0.01 mass % to 0.50 mass % (inclusive of 0.01 mass % and 0.50 mass %); Cu: 0.005 mass % to 1.0 mass % (inclusive of 0.005 mass % and 1.0 mass %); and Ni: 0.005 mass % to 2.0 mass % (inclusive of 0.005 mass % and 2.0 mass %).

Yet further, the chemical composition optionally contains at least one type of element selected from: W: 0.001 mass % to 2.0 mass % (inclusive of 0.001 mass % and 2.0 mass %); Nb: 0.001 mass % to 0.1 mass % (inclusive of 0.001 mass % and 0.1 mass %); Ti: 0.001 mass % to 0.2 mass % (inclusive of 0.001 mass % and 0.2 mass %); and V: 0.002 mass % to 0.5 mass % (inclusive of 0.002 mass % and 0.5 mass %).

Yet further, the chemical composition optionally contains, B: 0.0002 mass % to 0.005 mass % (inclusive of 0.0002 mass % and 0.005 mass %).

Yet further, the chemical composition optionally contains, N: 0.005 mass % to 0.020 mass % (inclusive of 0.005 mass % and 0.020 mass %).

Further, the method for manufacturing spring steel according to the present invention involves subjecting the steel material containing the aforementioned composition to the heat treatment as described in [7] above.

Effect of the Invention

The present invention allows high strength spring steel to be manufactured in a stable manner such that the spring steel possesses much better pitting corrosion resistance and corrosion fatigue property than conventional high strength spring steel. Moreover, the present invention makes a contribution to reducing weight of automobiles, thereby causing an industrially beneficial effect.

DESCRIPTION OF PREFERRED EMBODIMENTS

Figure 1:
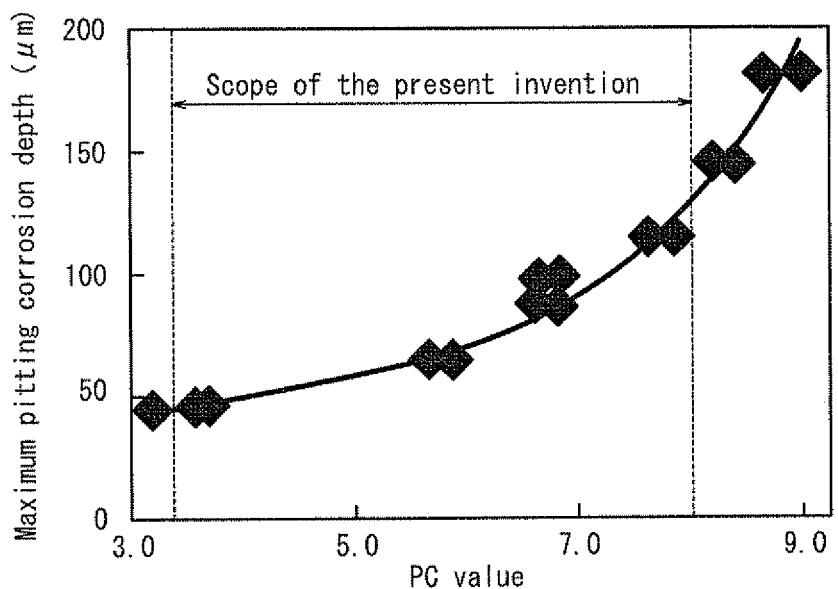
FIG. 1 is a view showing the evaluation results of pitting corrosion depth as a function of PC value.

A chemical composition of spring steel of the present invention and the manufacturing conditions thereof will now be described below.

C: greater than 0.35 mass % and less than 0.50 mass %

C is an element that is indispensable to ensure the required strength. In a case where C is contained in steel in a content of 0.35 mass % or less, then it is difficult to ensure a predetermined strength. Further, an alloy element needs to be added by a large amount in this case to ensure a predetermined strength, which leads to an increase in alloy cost. Therefore, C is to be contained in an amount greater than 0.35 mass %. On the other hand, if C is added in an amount of 0.50 mass % or more, then a large amount/content of carbides is generated in the steel and the pitting corrosion resistance deteriorates due to the corrosion occurring preferentially at the interface between the carbides and the parent phase, which leads to deterioration in corrosion fatigue property (corrosion fatigue resistance) and toughness. In view of the above, the amount of C is to be greater than 0.35 mass % and less than 0.50 mass %.

Si: greater than 1.75 mass % and less than or equal to 3.00 mass % Si as a deoxidizer and Si also improves strength and sag resistance of steel through solid solution strengthening and enhancement of resistance to temper softening. Moreover, Si is an element to be added for improving pitting corrosion resistance. Therefore silicon is added by an amount greater than 1.75 mass % in the present invention. However, if Si is added in an amount greater than 3.00 mass %, then the ductility is lowered and cracking occurs in the material during casting, which necessitates the surface maintenance of the material and leads to an increase in manufacturing cost. Further, as the steel is strengthened, there occurs significant deterioration in toughness and coiling properties of the steel. Therefore, the upper limit of Si is to be 3.00 mass %. In view of the above, the amount of Si is to be greater than 1.75 mass % and less than or equal to 3.00 mass %.

Mn: 0.2 mass % to 1.0 mass % (inclusive of 0.2 mass % and 1.0 mass %)

Since Mn is useful for improving the hardenability of the steel and enhancing its strength, Mn is to be added in an amount of 0.2 mass % or more. However, in a case where Mn is added in an amount greater than 1.0 mass %, then the steel is strengthened too much, which leads to a reduction in the toughness of the base material. Further, corrosion rate increases and pitting corrosion depth of the steel also deepens in this case, resulting in deterioration in corrosion fatigue property. Therefore, the upper limit of Mn is to be 1.0 mass %. In view of the above, the amount of Mn is to be 0.2 mass % to 1.0 mass %.

P, S: 0.025 mass % or less, respectively

P and S are segregated at the grain boundary, which leads to a reduction in the toughness of the base material. Further, P and S increase the corrosion rate and accordingly increase the pitting corrosion depth. Particularly, since S exists in the steel as MnS, the pitting corrosion depth is increased due to the dissolution of MnS. In view of the above, it is preferable that these elements are reduced as much as possible. Therefore, P and S are each to be contained in an amount of 0.025 mass % or less.

Cr: 0.01 mass % to 0.04 mass % (inclusive of 0.01 mass % and 0.04 mass %)

Cr is an element that improves hardenability of steel and increases strength of the steel. Therefore, Cr is to be added in an amount of 0.01 mass % or more. Further, Cr is an element that makes rust generated in a surface portion of steel dense to suppress corrosion. On the other hand, Cr is an element that increases the pitting corrosion depth and decreases the corrosion fatigue resistance because it reduces the pH value of a pitting corrosion portion. Therefore, according to the present invention, the content of Cr is controlled to be 0.04 mass % or less for improved pitting corrosion resistance. In view of the above, the content of Cr is to be 0.01 mass % to 0.04 mass %.

Mo: 0.1 mass % to 1.0 mass % (inclusive of 0.1 mass % and 1.0 mass %)

Mo is a particularly important element in the present invention. Mo is an element that improves the corrosion suppression and pitting corrosion resistance of steel by formation of a passivation film. Mo needs to be added in an amount of 0.1 mass % or more. However, adding Mo in an amount exceeding 1.0 mass % leads to a reduction in toughness due to strengthening and an increase in alloy cost. In view of the above, the amount of Mo is to be 0.1 to 1.0 mass %.

O: 0.0015 mass % or less

O is an element that is bonded with Si or Al to form a hard oxide-based non-metal inclusion, which leads to deterioration in fatigue life properties. It is thus preferable that O is reduced as much as possible. In the present invention, however, up to 0.0015 mass % is acceptable.

PC value (see Formula (1) above): greater than 3.3 and equal to or less than 8.0

Figure 2:
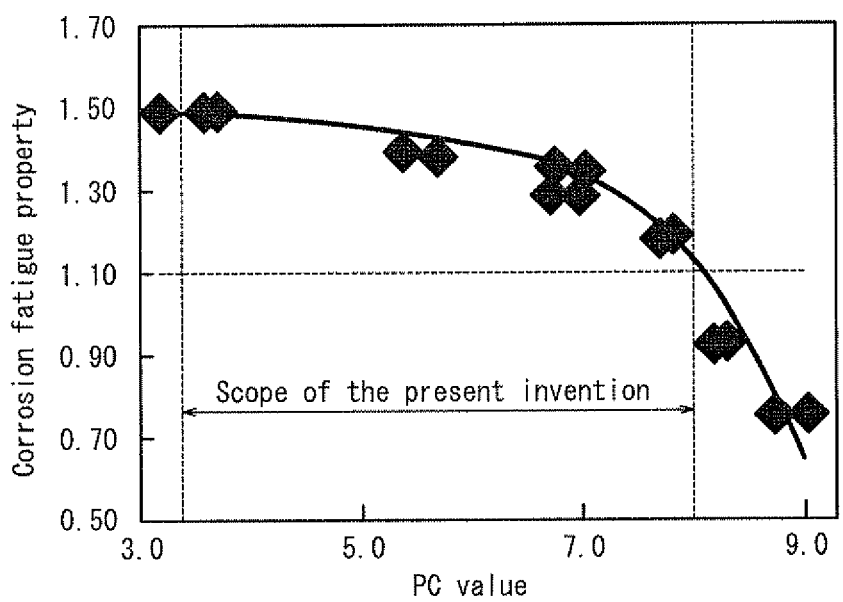
FIG. 2 is a view showing the evaluation results of corrosion fatigue property as a function of PC value.

Further, the inventors have manufactured spring steel samples by changing the chemical composition and PC value thereof in various manners and analyzed the pitting corrosion depth and corrosion fatigue resistance thereof. It should be noted that pitting corrosion depth and corrosion fatigue resistance (corrosion fatigue property) were evaluated using a test method as described later. The chemical compositions are shown in Table 1 and the evaluation results of pitting corrosion depth and corrosion fatigue resistance are shown in Table 2, respectively. Yet further, FIGS. 1 and 2 show the evaluation results (vertical axis) of pitting corrosion depth and corrosion fatigue resistance, respectively, as each a function of PC value (horizontal axis).

It should be noted here that each of the spring steel samples was manufactured under the same conditions except for the reference steel. Specifically, the manufacturing conditions were as follows.

Firstly, a billet prepared by vacuum melting as smelting technique was heated to 1100° C. and subjected to hot rolling to be finished to a round bar with a diameter of 25 mm. The round bar was then subjected to a normalizing process at 950° C. for one hour and then drawn into a wire having diameter of 15 mm. The resulting wire rod was subjected to a quenching-tempering process with high-frequency heating. In this case, heat treatment was conducted under the following condition: the wire rod was heated to 1000° C. at a heating rate of 100° C./sec, retained for 5 seconds, and then cooled to 50° C. at 50° C./sec. Tempering was conducted under the following condition: the wire rod was heated to 300° C. at a heating rate of 50° C./sec, retained for 20 seconds, and then air cooled.

On the other hand, reference steel (SUPT-based "A-1") was drawn into a wire having diameter of 15 mm and then subjected to quenching-tempering process. Quenching was conducted under the following condition: the steel was heated to 840° C. in an electric furnace (this process will also be simply referred to as "furnace heating" hereinafter), retained for 0.5 hours, and then quenched in oil at 60° C. Tempering was conducted under the following condition: the steel thus quenched was heated to 510° C., retained for one hour, and then allowed to cool.

As described in Table 2, FIGS. 1 and 2, pitting corrosion depth increased and corrosion fatigue resistance decreases when the PC value exceeded 8.0. Further significant decrease in pitting corrosion depth or further significant improvement in corrosion fatigue resistance was not observed when the PC value is 3.3 or less. Moreover, more alloy elements need be added when the PC values is 3.3 or less, which leads to an increase in alloy cost. In view of the above, it was found out that the pitting corrosion resistance and the corrosion fatigue resistance were improved by adjusting the PC values to be within a range greater than 3.3 and less than or equal to 8.0.

TABLE 1

| Steel sample ID | Chemical Composition (mass %) | | | | | | | | | PC value*1 | AR value*2 | AC3 point (° C.) | Note |
|---|---|---|---|---|---|---|---|---|---|---|---|---|---|
| | C | Si | Mn | P | S | Cr | Mo | O | N | | | | |
| A-1 | 0.60 | 2.00 | 0.85 | 0.020 | 0.015 | — | — | 0.0010 | 0.003 | — | — | 814 | Reference Steel |
| A-2 | 0.43 | 2.00 | 0.89 | 0.015 | 0.006 | 0.04 | 0.21 | 0.0009 | 0.004 | 7.1 | 0.19 | 849 | Steel of Present Invention |
| A-3 | 0.49 | 1.76 | 0.98 | 0.015 | 0.009 | 0.03 | 0.12 | 0.0008 | 0.004 | 7.9 | 0.25 | 825 | Steel of Present Invention |
| A-4 | 0.36 | 3.00 | 0.21 | 0.012 | 0.010 | 0.04 | 0.65 | 0.0008 | 0.003 | 3.7 | 0.06 | 917 | Steel of Present Invention |
| A-5 | 0.41 | 3.00 | 0.99 | 0.011 | 0.005 | 0.04 | 0.99 | 0.0009 | 0.004 | 7.1 | 0.04 | 878 | Steel of Present Invention |
| A-6 | 0.36 | 2.00 | 0.72 | 0.007 | 0.004 | 0.03 | 0.21 | 0.0005 | 0.003 | 6.0 | 0.14 | 867 | Steel of Present Invention |
| A-7 | 0.30 | 2.95 | 0.21 | 0.011 | 0.008 | 0.04 | 1.20 | 0.0009 | 0.006 | 3.2 | 0.03 | 928 | Comparative Steel |
| A-8 | 0.49 | 1.76 | 1.00 | 0.012 | 0.006 | 0.04 | 0.10 | 0.0009 | 0.004 | 8.4 | 0.40 | 823 | Comparative Steel |
| A-9 | 0.45 | 2.00 | 0.71 | 0.015 | 0.005 | 0.17 | 0.16 | 0.0011 | 0.003 | 9.3 | 1.06 | 850 | Comparative Steel |
| A-10 | 0.42 | 1.99 | 0.89 | 0.014 | 0.005 | 0.04 | 0.20 | 0.0009 | 0.015 | 6.9 | 0.20 | 850 | Steel of Present Invention |
| A-11 | 0.48 | 1.76 | 0.98 | 0.013 | 0.008 | 0.03 | 0.13 | 0.0008 | 0.006 | 7.7 | 0.23 | 826 | Steel of Present Invention |
| A-12 | 0.36 | 3.00 | 0.21 | 0.014 | 0.010 | 0.04 | 0.64 | 0.0008 | 0.005 | 3.6 | 0.06 | 918 | Steel of Present Invention |
| A-13 | 0.40 | 2.95 | 0.99 | 0.010 | 0.006 | 0.04 | 0.99 | 0.0009 | 0.007 | 6.9 | 0.04 | 879 | Steel of Present Invention |
| A-14 | 0.37 | 2.03 | 0.72 | 0.007 | 0.004 | 0.03 | 0.22 | 0.0005 | 0.019 | 5.7 | 0.14 | 865 | Steel of Present Invention |
| A-15 | 0.30 | 2.95 | 0.21 | 0.010 | 0.005 | 0.04 | 1.20 | 0.0009 | 0.006 | 3.2 | 0.03 | 928 | Comparative Steel |
| A-16 | 0.49 | 1.76 | 1.00 | 0.011 | 0.006 | 0.04 | 0.10 | 0.0009 | 0.006 | 8.3 | 0.40 | 822 | Comparative Steel |
| A-17 | 0.44 | 2.00 | 0.71 | 0.013 | 0.007 | 0.17 | 0.21 | 0.0011 | 0.012 | 8.9 | 0.81 | 852 | Comparative Steel |

*1 PC value = $4.2 \times ([C] + [Mn]) + 0.1 \times (1/[Si] + 1/[Mo]) + 20.3 \times [Cr] + 0.001 \times (1/[N])$
*2 AR value = $[Cr]/[Mo]$

TABLE 2

| Steel sample ID | PC Value | Tensile Strength (MPa) | Martensite Fraction (%) | Maximum Pitting Corrosion Depth (μm) | Corrosion Fatigue Property | Sag resistance (mm) | Note |
|---|---|---|---|---|---|---|---|
| A-1 | — | 2015 | 90 | 155 | 1.00 | 3.9 | Reference Steel |
| A-2 | 7.1 | 2130 | 92 | 100 | 1.29 | 2.6 | Steel of Present Invention |
| A-3 | 7.9 | 2041 | 92 | 110 | 1.22 | 2.7 | Steel of Present Invention |
| A-4 | 3.7 | 2155 | 94 | 46 | 1.50 | 2.5 | Steel of Present Invention |
| A-5 | 7.1 | 2183 | 91 | 89 | 1.35 | 2.5 | Steel of Present Invention |
| A-6 | 6.0 | 2039 | 93 | 65 | 1.39 | 2.7 | Steel of Present Invention |
| A-7 | 3.2 | 2015 | 92 | 44 | 1.51 | 3.2 | Comparative Steel |
| A-8 | 8.4 | 2016 | 93 | 150 | 0.91 | 3.7 | Comparative Steel |
| A-9 | 9.3 | 2049 | 92 | 185 | 0.75 | 2.7 | Comparative Steel |
| A-10 | 6.9 | 2125 | 93 | 99 | 1.29 | 2.5 | Steel of Present Invention |
| A-11 | 7.7 | 2051 | 92 | 111 | 1.22 | 2.8 | Stool of Present Invention |
| A-12 | 3.6 | 2150 | 94 | 47 | 1.50 | 2.5 | Steel of Present Invention |
| A-13 | 6.9 | 2183 | 91 | 90 | 1.35 | 2.4 | Steel of Present invention |
| A-14 | 5.7 | 2040 | 95 | 65 | 1.39 | 2.7 | Steal of Present Invention |
| A-15 | 3.2 | 2015 | 92 | 45 | 1.51 | 3.3 | Comparative Steel |
| A-16 | 8.3 | 2016 | 93 | 150 | 0.91 | 3.7 | Comparative Steel |
| A-17 | 8.9 | 2048 | 92 | 185 | 0.75 | 2.8 | Comparative Steel |

$[Cr]/[Mo] \leq 0.35$ (wherein [brackets] denote the content of an element in the brackets (in mass %))

Ratio of $[Cr]/[Mo]$ (referred to hereinafter as "AR value") is expressed as a ratio of Cr content with respect to Mo content in steel. It should be noted here that Cr is an element that increases pitting corrosion depth as content thereof in steel increases and that Mo is an element that decreases pitting corrosion depth as content thereof in steel increases. Therefore, if a further improvement in pitting corrosion depth is to be pursued, it is preferable to control the ratio of $[Cr]/[[Mo]$, as well. Specifically, pitting corrosion depth increases due to too much Cr influence and too weak corrosion depth suppression effect by Mo when the AR value exceeds 0.35. It is thus preferable that the AR value is 0.35 or less.

Further, in addition to the above components, in order to enhance the strength and improve pitting corrosion resistance and corrosion fatigue property of the steel, the spring steel of the present invention may also contain the following elements:

At least one type of element selected from: Al: 0.01 mass % to 0.50 mass % (inclusive of 0.01 mass % and 0.50 mass %); Cu: 0.005 mass % to 1.0 mass % (inclusive of 0.005 mass % and 1.0 mass %); and Ni: 0.005 mass % to 2.0 mass % (inclusive of 0.005 mass % and 2.0 mass %)

Cu and Ni are elements that each enhance strength after tempering and improve hardenability and corrosion resistance of steel. Cu and Ni may be selectively added to steel.

To achieve such good effects as described above, it is preferable that Cu, Ni are added to steel by an amount of 0.005 mass % or more. However, Cu content exceeding 1.0 mass % and Ni content exceeding 2.0 mass % increases cost for alloy. It is thus preferable that Cu is added in an amount up to 1.0 mass % and Ni is added in an amount up to 2.0 mass %.

Al is an element that serves excellently as a deoxidizer and also suppresses growth of austenite grains during quenching to effectively maintain strength of steel. It is thus preferable that Al is added to steel in an amount of 0.01 mass %. However, Al content in steel exceeding 0.50 mass % does not involve further improvement in effect but rather disadvantageously increases cost and deteriorates cold coiling properties of the steel. It is thus preferable that Al is added in an amount up to 0.50 mass %.

At least one type of element selected from: W: 0,001 mass % to 2.0 mass % (inclusive of 0.001 mass % and 2.0 mass %); Nb: 0.001 mass % to 0.1 mass % (inclusive of 0.001 mass % and 0.1 mass %); Ti: 0.001 mass % to 0.2 mass % (inclusive of 0.001 mass % and 0.2 mass %); and V: 0.002 mass % to 0.5 mass % (inclusive of 0.002 mass % and 0.5 mass %)

W, Nb, Ti and V are elements that each improve hardenability and increase strength after tempering of steel and may be selectively added depending on the required strength. Tungsten is an element that improves pitting corrosion resistance of steel, as well. To achieve such effects as described above, it is preferable that W, Nb and Ti are each added to steel by an amount of 0.001 mass % or more and that V is added to steel by an amount of 0.002 mass % or more. However, V content exceeding 0.5 mass %, Nb content exceeding 0.1 mass %, and Ti content exceeding 0.2 mass % in steel results in a large amount of carbides generated in the steel and deteriorates pitting corrosion resistance due to corrosion occurring preferentially at the interface between the carbides and the parent phase, which eventually decrease corrosion fatigue resistance. It is therefore preferable that each of Nb, Ti and V is added by an amount up to the above-identified upper limit of content thereof. Further, W content in steel exceeding 2.0 mass % increases strength of steel too much to deteriorate toughness thereof, which leads to an increase in alloy cost. It is thus preferable that W is added by an amount up to 2.0 mass %.

B: 0.0002 mass % to 0.005 mass % (inclusive of 0.0002 mass % and 0.005 mass %)

B is an element that enhances strength of steel after tempering through increase in hardenability and may be contained optionally. To achieve this effect, it is preferable that B is added in an amount of 0.0002 mass % or more. However, adding B to steel by an amount exceeding 0.005 mass % deteriorates cold formability of the steel. It is thus preferable that B is added in an amount within a range of 0.0002 to 0.005 mass %.

N: 0.005 mass % to 0.020 mass % (inclusive of 0.005 mass % and 0.020 mass %)

N is an element that improves corrosion suppression and pitting corrosion resistance of a steel material. To develop this effect, N may be added to steel by an amount of 0.005 mass % or more. However, in a case where N is added to steel by an amount exceeding 0.020 mass %, nitrides are more likely formed at the grain boundary, which causes intergranular corrosion to decrease corrosion resistance of the steel. Further, pitting corrosion resistance deteriorates due to the corrosion occurring preferentially at the interface between the nitrides and the parent phase in this case, which leads to deterioration in corrosion fatigue property and decrease in toughness of the steel. Accordingly, content of N is to be 0.005 mass % to 0.020 mass % when N is added intentionally.

As described above, the present invention includes a case where N is not intentionally added to the spring steel but the spring steel naturally contains N therein as an incidental impurity by a content less than 0.005 mass %. The content (mass %) of N contained as an incidental impurity or, if N is added intentionally, the content (mass %) of N after the intentional addition is used as the nitrogen content [N] of formula (1) above.

The balance other than the above-described elements is Fe and incidental impurities.

Any steel ingot, regardless of whether being formed by smelting (blowing) in a converter or by vacuum smelting, may be used as long as the steel ingot has a chemical composition as described above. Such a material as a steel ingot, a slab, a bloom or a billet, is subjected to heating, hot-rolling, pickling for scale removal, and subsequent wiredrawing to be finished to a drawn wire having predetermined thickness for use as steel for springs.

Further, the wiredrawn wire thus obtained is subjected to quenching-tempering process to impart the wire with following microstructure and mechanical properties.

Martensite fraction: 90% or more.

Martensite is a structure that is necessary for obtaining satisfactory strength of steel. According to the present invention, setting martensite fraction in microstructure of steel to be at least 90% in volume ratio achieves excellent properties of the steel. Specifically, the volume fraction of martensite less than 90% results in too much contents of non-transformed phases such as retained austenite phase not contributing to increase in strength of the steel and deposits such as carbides, which make it difficult to achieve the desired high strength, i.e. tensile strength of 1900 MPa or more. The martensite fraction may be 100%.

The above-described chemical composition and steel microstructure, as well as a tensile strength of 1900 MPa or more, are required of the spring steel of the present invention. Tensile strength of 1900 MPa or more is required because a tensile strength less than 1900 MPa cannot reach the desired strengthening of spring steel, Next, the manufacturing conditions for obtaining the above-described microstructure and tensile strength will be described.

In order to obtain the above-mentioned steel, it is effective to subject the steel material with the above-mentioned chemical composition to quenching-tempering process. While a martensite fraction of 90% or more can be obtained by heating a steel material to $Ac_3$ point or higher and quenching the steel material, heating the steel material at temperature exceeding ($Ac_3$ point+200° C.) coarsens prior austenite grains. In view of this, although it depends on the size of a steel material, it is the most effective to carry out a process of heating the steel material to temperature in the range of $Ac_3$ point to ($Ac_3$ point+200° C.) (inclusive of $Ac_3$ point and ($Ac_3$ point+200° C.)), retaining the steel material in the range and cooling the steel material to 200° C. or lower at a cooling rate of 10° C./sec or higher for quenching in terms of achieving the above-mentioned martensite fraction of 90% or more.

Further, in tempering process, it is important to distribute carbides in a grain as finely as possible.

If a coarse carbide is formed, the carbide forms a local battery with its parent phase and dissolves itself to form pitting corrosion. The pitting corrosion thus formed deepens as corrosion proceeds at the bottom of the pitting corrosion.

The more the pitting corrosion deepens, the more the corrosion fatigue property (resistance) deteriorates. Adequately setting tempering conditions is important in order to avoid such a situation as described above and achieve the above-described tensile strength of the steel. To this end, it is effective to perform tempering at temperature in the range of 150° C. to 500° C. before cooling.

It is preferable that: the steel material is subjected to hot rolling to be finished to a wire rod or bar steel; the wire rod or the bar steel is subjected to descaling with pickling and subsequent wiredrawing; and the steel material is formed into a spring either before the above-mentioned quenching-tempering process, or after the quenching-tempering process, or between quenching process and tempering process.

The high strength spring steel thus obtained, although it can be manufactured at relatively low cost, possesses high strength, excellent pitting corrosion resistance and excellent corrosion fatigue resistance and may be applied to any component that requires strength of 1900 MPa or more, e.g. a suspension spring as one of chassis underbody members of automobiles.

EXAMPLE 1

Steel samples having the corresponding chemical compositions shown in Table 3 were smelted in a vacuum melting furnace to produce billets from these steel samples. Each of the billets was heated to 1100° C. and then subjected to hot rolling to be finished to a round bar with a diameter of 25 mm. Subsequently, the round bar was subjected to a normalizing process at 950° C. for one hour and then to wiredrawing to obtain a wire material sample having diameter of 15 mm. The resulting wire material sample was subjected to a quenching-tempering process with high-frequency heating under the conditions shown in Table 4.

The wire material sample thus treated was then subjected to the following tensile test, corrosion test, pitting corrosion depth measurement, corrosion fatigue test and sag test. The wire material sample was also subjected to measurement of its martensite fraction as described below.

[Martensite Fraction]

Martensite fraction was determined by: collecting a thin-film sample from the vicinity of a ¼×D portion of the wire material sample (D is the diameter of the wire material sample); observing 20 fields of the thin-film sample with a transmission electron microscope at ×20,000; measuring the area of regions where cementite had not been precipitated; calculating a ratio of the area thus measured with respect to the entire microstructure area; and regarding the ratio as martensite fraction.

[Tensile Test]

A tensile test was conducted by: collecting a tensile test specimen (diameter in the parallel portion: 6 mmϕ, length of the parallel portion: 32 mm, diameter of each grip portion: 12 mmϕ from the wire material sample such that the radial center of the specimen coincided with the center (½×D portion) of the wire material sample; and measuring tensile strength under conditions including gauge length: 25 mm and tension speed: 5 mm/min.

[Corrosion Test]

Figure 3:
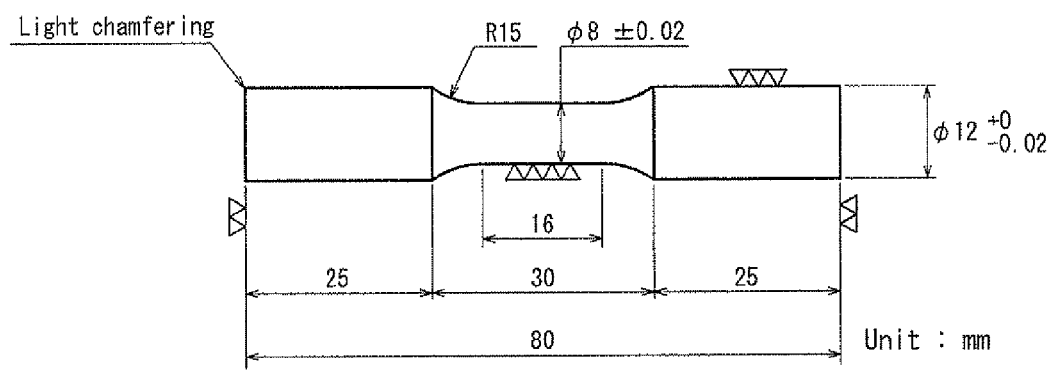
FIG. 3 is a view showing a shape of a test specimen subjected to a corrosion test.

While it would be preferable to actually produce springs, mount the springs on a vehicle and carry out an in-vehicle research in order to evaluate pitting corrosion resistance and corrosion fatigue resistance, such a research would require too much time and cost. As such, test specimens as shown in FIG. 3 were collected from the wire material samples and each subjected to a corrosion test. The corrosion test was the salt spray-constant temperature and humidity cycle test. Each test specimen was subjected to a pretreatment including ultrasonic cleaning in acetone for 10 minutes and subsequent masking with polyester tape at end and grip portions thereof. Each of the masked test specimens was subjected to the salt spray-constant temperature and humidity cycle test over seven cycles, each cycle including "salt spray for 8 hours" and subsequent "retaining for 16 hours under constant temperature and humidity (35° C., 50%)". It should be noted that the salt spray test was performed according to JISZ2371. The test details are as follows.

<Salt Spray Test>
salt water sprayed: 5% salt water (50±5 g/l), specific gravity: 1.029 to 1.036, pH: 6.5 to 7.2
test bath temperature: 35° C.
amount of spray: 1.5±0.5 ml/80 cm²/1h
<Constant Temperature and Humidity Test>
test bath temperature: 35° C.
test bath humidity: 50% RH
<Test Instrument>
Combined Cyclic Corrosion Test Instrument CYP-90, manufactured by Suga Test Instruments Co., Ltd.
<Measurement of Pitting Corrosion Depth>

Figure 6:
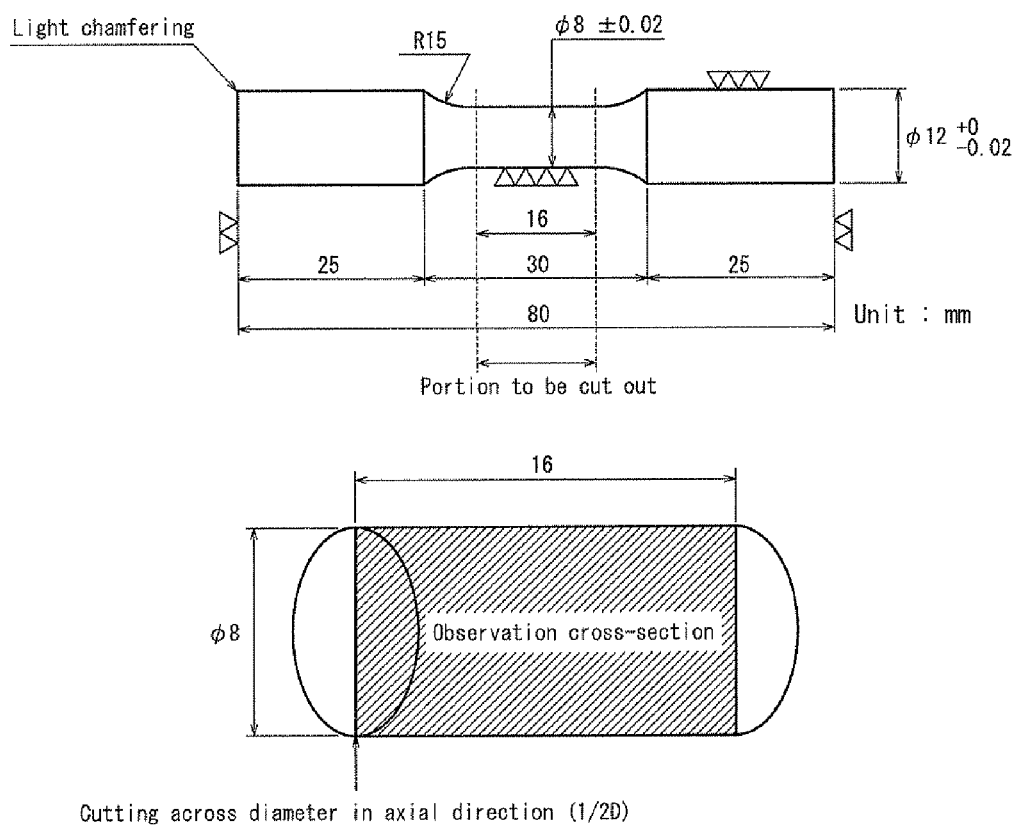
FIG. 6 is a view showing a shape of a sample for pitting corrosion depth measurement.

Upon completion of the above-mentioned corrosion test, each of the test specimen was immersed in a 20% di-ammonium hydrogen citrate aqueous solution at 80° C. for 20 minutes for rust removal in accordance with JIS Z2371 (Reference Table 1, "Methods for Removal of Chemical Corrosion Products"). Then, a parallel section was cut out from the test specimen as shown in FIG. 6 to measure depths of corrosion pits. The largest one among the pitting corrosion depths thus measured was regarded as the maximum pitting corrosion depth of the test specimen.

[Corrosion Fatigue Test]

Upon completion of the above-mentioned corrosion test, each of the test specimens were immersed in a 20% di-ammonium hydrogen citrate aqueous solution at 80° C. for 20 minutes for rust removal in accordance with JIS Z2371 (Reference Table 1, "Methods for Removal of Chemical Corrosion Products"). Thereafter, fatigue limit was analyzed for each test specimen by using a 147 test machine as a Shimazu-Ono type rotating bending fatigue test machine manufactured by Shimadzu Corporation. Values of fatigue limit of the test specimens thus determined were divided by the value of fatigue limit of the reference steel material for normalization and it was evaluated that corrosion fatigue property (resistance) improved when a value of fatigue limit thus normalized was equal to or larger than 1.1.

[Sag Test]

Figure 4:
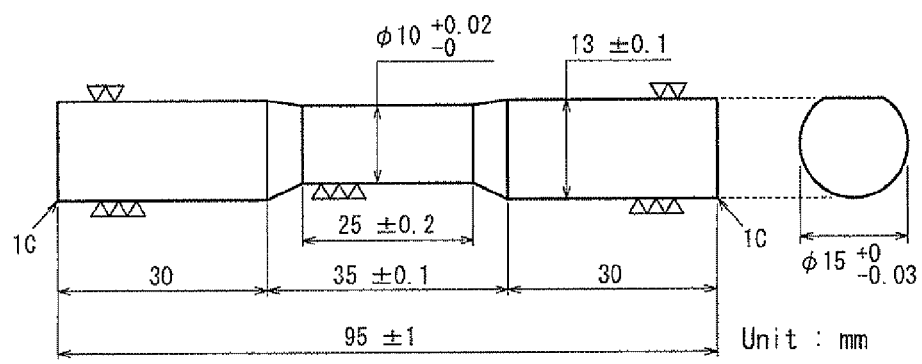
FIG. 4 is a view showing a shape of a test specimen subjected to an sag resistance evaluation test.
Figure 5:
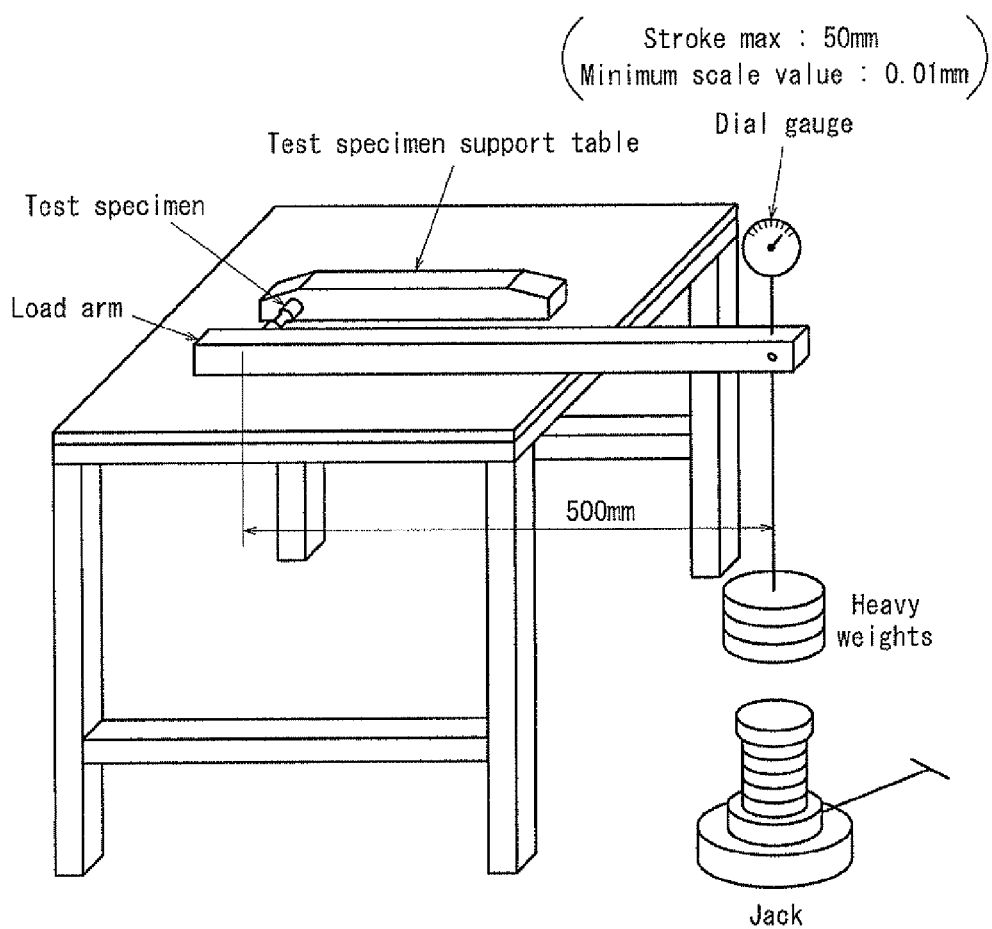
FIG. 5 is a schematic diagram of a tester for the sag resistance evaluation test.

While it would be preferable to evaluate sag resistance as an important property for spring steel by in-vehicle research, such a research would require too much time and cost. As such, sag resistance was evaluated by a torsional creep test. Specifically, a test specimen as shown in FIG. 4 was collected from each wire material sample wiredrawn to have diameter of 15 mm and the test specimen was subjected to a sag test. The sag test involved: imparting a test specimen with a 1% prestrain which simulated setting of a spring; further imparting the test specimen with torsional stress by weights; measuring a descending (sag) magnitude of the weight; and evaluating sag resistance according to the sag magnitude after 96 hours. FIG. 5 shows an overview of the sag test.

TABLE 3

| Steel sample ID | Chemical Composition (mass %) | | | | | | | | | | |
|---|---|---|---|---|---|---|---|---|---|---|---|
| | C | Si | Mn | P | S | Cr | Mo | O | Al | Cu | Ni |
| A-1 | 0.60 | 2.00 | 0.85 | 0.020 | 0.015 | — | — | 0.0010 | — | — | — |
| B-1 | 0.40 | 2.00 | 0.30 | 0.015 | 0.006 | 0.04 | 0.42 | 0.0009 | — | — | — |
| B-2 | 0.39 | 1.85 | 0.29 | 0.015 | 0.006 | 0.04 | 0.26 | 0.0009 | 0.02 | — | — |
| B-3 | 0.43 | 2.01 | 0.91 | 0.011 | 0.005 | 0.01 | 0.22 | 0.0008 | 0.02 | — | — |
| B-4 | 0.49 | 1.76 | 0.21 | 0.009 | 0.004 | 0.02 | 0.41 | 0.0007 | — | 0.73 | 1.50 |
| B-5 | 0.49 | 1.76 | 1.00 | 0.007 | 0.003 | 0.04 | 0.10 | 0.0009 | 0.02 | — | — |
| B-6 | 0.36 | 3.00 | 0.20 | 0.016 | 0.003 | 0.03 | 0.33 | 0.0007 | 0.12 | 0.21 | 0.42 |
| B-7 | 0.43 | 2.16 | 0.53 | 0.021 | 0.005 | 0.02 | 0.25 | 0.0007 | — | 0.92 | 1.98 |
| B-8 | 0.46 | 2.53 | 0.61 | 0.014 | 0.006 | 0.03 | 0.42 | 0.0010 | 0.31 | — | — |
| B-9 | 0.41 | 1.82 | 0.35 | 0.011 | 0.006 | 0.02 | 0.12 | 0.0011 | — | — | — |
| B-10 | 0.38 | 2.77 | 0.75 | 0.012 | 0.008 | 0.01 | 0.62 | 0.0009 | — | 0.25 | 0.45 |
| B-11 | 0.55 | 2.15 | 0.33 | 0.015 | 0.007 | 0.04 | 0.21 | 0.0008 | 0.02 | — | — |
| B-12 | 0.43 | 1.70 | 0.46 | 0.015 | 0.006 | 0.04 | 0.35 | 0.0007 | 0.03 | — | — |
| B-13 | 0.36 | 2.95 | 0.21 | 0.011 | 0.007 | 0.19 | 0.31 | 0.0009 | — | 0.21 | 0.44 |
| B-14 | 0.49 | 1.82 | 0.98 | 0.009 | 0.008 | 0.03 | 0.42 | 0.0008 | 0.03 | — | — |
| B-15 | 0.38 | 2.00 | 0.26 | 0.007 | 0.006 | 0.02 | 0.51 | 0.0006 | 0.03 | — | — |
| B-16 | 0.31 | 2.00 | 0.22 | 0.007 | 0.005 | 0.03 | 0.50 | 0.0008 | 0.03 | — | — |
| B-17 | 0.37 | 1.89 | 0.73 | 0.006 | 0.005 | 0.01 | 0.77 | 0.0009 | — | 0.15 | 0.33 |
| B-18 | 0.38 | 2.82 | 0.88 | 0.009 | 0.006 | 0.02 | 0.99 | 0.0010 | — | — | — |
| B-19 | 0.41 | 2.15 | 1.23 | 0.010 | 0.007 | 0.03 | 0.33 | 0.0010 | 0.02 | — | — |
| B-20 | 0.38 | 2.01 | 0.66 | 0.015 | 0.006 | 0.03 | 0.05 | 0.0011 | — | 0.11 | 0.25 |
| B-21 | 0.42 | 1.95 | 0.33 | 0.015 | 0.004 | 0.02 | 0.80 | 0.0008 | 0.03 | — | — |
| B-22 | 0.42 | 2.01 | 0.91 | 0.011 | 0.006 | 0.04 | 0.25 | 0.0007 | 0.03 | 0.30 | 0.70 |
| B-23 | 0.49 | 1.78 | 0.88 | 0.010 | 0.005 | 0.04 | 0.10 | 0.0008 | 0.03 | — | — |
| B-24 | 0.42 | 2.05 | 0.29 | 0.015 | 0.006 | 0.04 | 0.26 | 0.0009 | 0.02 | — | — |
| B-25 | 0.43 | 2.01 | 0.91 | 0.011 | 0.005 | 0.01 | 0.22 | 0.0008 | 0.02 | — | — |
| B-26 | 0.41 | 1.99 | 0.88 | 0.008 | 0.006 | 0.06 | 0.18 | 0.0008 | 0.03 | — | — |
| B-27 | 0.40 | 2.01 | 0.85 | 0.010 | 0.006 | 0.08 | 0.11 | 0.0008 | 0.02 | — | — |

| Steel sample ID | Chemical Composition (%) | | | | | | PC Value*1 | AR Value*2 | Note |
|---|---|---|---|---|---|---|---|---|---|
| | W | Nb | Ti | V | B | N | | | |
| A-1 | — | — | — | — | — | 0.003 | — | — | Reference Steel |
| B-1 | — | — | — | — | — | 0.003 | 4.4 | 0.10 | Conforming Steel |
| B-2 | — | — | 0.015 | — | — | 0.004 | 4.4 | 0.15 | Conforming Steel |
| B-3 | — | — | 0.023 | — | 0.0021 | 0.004 | 6.6 | 0.05 | Conforming Steel |
| B-4 | — | — | 0.051 | 0.05 | — | 0.003 | 4.0 | 0.05 | Conforming Steel |
| B-5 | — | — | — | 0.06 | — | 0.004 | 8.4 | 0.40 | Comparative Steel |
| B-6 | 0.51 | — | — | — | 0.0035 | 0.004 | 3.5 | 0.09 | Conforming Steel |
| B-7 | 1.69 | — | 0.012 | — | 0.0048 | 0.003 | 5.2 | 0.08 | Conforming Steel |
| B-8 | — | 0.07 | — | — | — | 0.003 | 5.7 | 0.07 | Conforming Steel |
| B-9 | 0.72 | — | 0.099 | — | 0.0022 | 0.004 | 4.7 | 0.17 | Conforming Steel |
| B-10 | — | — | — | 0.31 | — | 0.003 | 5.5 | 0.02 | Conforming Steel |
| B-11 | — | — | — | — | — | 0.004 | 5.3 | 0.19 | Comparative Steel |
| B-12 | — | 0.02 | 0.021 | — | 0.0011 | 0.004 | 5.1 | 0.11 | Comparative Steel |
| B-13 | — | — | — | — | — | 0.004 | 6.9 | 0.61 | Comparative Steel |
| B-14 | 0.02 | 0.01 | 0.035 | 0.12 | 0.0031 | 0.003 | 7.4 | 0.07 | Conforming Steel |
| B-15 | — | 0.03 | 0.051 | 0.09 | 0.0022 | 0.004 | 3.6 | 0.04 | Conforming Steel |
| B-16 | — | 0.02 | 0.083 | 0.19 | 0.0023 | 0.004 | 3.3 | 0.06 | Comparative Steel |
| B-17 | — | — | 0.023 | 0.22 | 0.0021 | 0.004 | 5.3 | 0.01 | Conforming Steel |
| B-18 | — | — | — | — | — | 0.003 | 6.2 | 0.02 | Conforming Steel |
| B-19 | — | 0.01 | — | — | — | 0.005 | 8.0 | 0.09 | Comparative Steel |
| B-20 | — | — | 0.019 | 0.10 | 0.0025 | 0.003 | 7.4 | 0.60 | Comparative Steel |
| B-21 | 0.33 | — | — | — | — | 0.004 | 4.0 | 0.03 | Conforming Steel |
| B-22 | — | — | 0.033 | 0.11 | 0.0021 | 0.003 | 7.2 | 0.16 | Conforming Steel |
| B-23 | 0.25 | — | — | 0.05 | 0.0033 | 0.004 | 7.9 | 0.40 | Conforming Steel |
| B-24 | — | — | 0.015 | — | — | 0.004 | 4.5 | 0.15 | Conforming Steel |
| B-25 | — | — | 0.023 | — | 0.0021 | 0.003 | 6.7 | 0.05 | Conforming Steel |
| B-26 | — | — | 0.016 | — | — | 0.004 | 7.5 | 0.33 | Comparative Steel |
| B-27 | — | — | 0.017 | — | 0.0019 | 0.005 | 8.0 | 0.73 | Comparative Steel |

*1 PC Value = $4.2 \times ([C] + [Mn]) + 0.1 \times (1/[Si] + 1/[Mo]) + 20.3 \times [Cr] + 0.001 \times (1/[N])$
*2 AR Value = [Cr]/[Mo]

TABLE 4

| Steel sample ID | Ac₃ (for reference) | Quenching Process ||||||
|---|---|---|---|---|---|---|---|
| | | Heating Method | Heating Temp. (° C.) | Heating Rate (° C./s) | Retention Time (sec) | Cooling Method | Cooling Rate (° C./s) |
| A-1 | 814 | Furnace Heating | 840 | 20 | 1000 | 60° C. Oil Cooking | 30 |
| B-1 | 876 | High Frequency | 950 | 200 | 2 | Water Cooling | 50 |
| B-2 | 874 | High Frequency | 950 | 200 | 5 | Water Cooling | 30 |
| B-3 | 847 | High Frequency | 1000 | 125 | 15 | Water Cooling | 35 |
| B-4 | 816 | High Frequency | 1000 | 150 | 5 | Water Cooling | 40 |
| B-5 | 823 | High Frequency | 1000 | 125 | 10 | Water Cooling | 50 |
| B-6 | 909 | High Frequency | 1050 | 150 | 5 | Water Cooling | 50 |
| B-7 | 823 | High Frequency | 950 | 200 | 10 | Water Cooling | 40 |
| B-8 | 867 | High Frequency | 900 | 200 | 20 | Water Cooling | 40 |
| B-9 | 865 | High Frequency | 950 | 200 | 20 | Water Cooling | 35 |
| B-10 | 888 | High Frequency | 900 | 200 | 55 | Water Cooling | 50 |
| B-11 | 846 | High Frequency | 950 | 200 | 15 | Water Cooling | 50 |
| B-12 | 854 | High Frequency | 950 | 200 | 10 | Water Cooling | 40 |
| B-13 | 905 | High Frequency | 1000 | 200 | 10 | Water Cooling | 50 |
| B-14 | 829 | High Frequency | 1000 | 125 | 20 | Water Cooling | 100 |
| B-15 | 882 | High Frequency | 1050 | 200 | 25 | Water Cooling | 80 |
| B-16 | 902 | High Frequency | 1000 | 200 | 10 | Water Cooling | 50 |
| B-17 | 851 | High Frequency | 950 | 100 | 5 | Water Cooling | 70 |
| B-18 | 883 | High Frequency | 950 | 125 | 5 | Water Cooling | 60 |
| B-19 | 844 | High Frequency | 950 | 200 | 10 | Water Cooling | 60 |
| B-20 | 866 | High Frequency | 900 | 200 | 5 | Water Cooling | 50 |
| B-21 | 869 | High Frequency | 950 | 200 | 2 | Water Cooling | 50 |
| B-22 | 837 | High Frequency | 850 | 80 | 3 | Water Cooling | 100 |
| B-23 | 829 | High Frequency | 850 | 65 | 5 | Water Cooling | 100 |
| B-24 | 873 | High Frequency | 900 | 100 | 15 | Water Cooling | 100 |
| B-25 | 847 | High Frequency | 1035 | 100 | 5 | Water Cooling | 100 |
| B-26 | 850 | High Frequency | 1035 | 100 | 5 | Water Cooling | 100 |
| B-27 | 855 | High Frequency | 1035 | 100 | 5 | Water Cooling | 100 |

| Steel sample ID | Tempering Process |||||  |
|---|---|---|---|---|---|---|
| | Heating Method | Heating Temp (° C.) | Heating Rate (° C./s) | Retension Time (sec) | Cooling Method | Note |
| A-1 | Furnace Heating | 510 | 20 | 3600 | Air Cooling | Reference Steel |
| B-1 | High Frequency | 300 | 100 | 5 | Air Cooling | Steel of Present Invention |
| B-2 | High Frequency | 350 | 100 | 5 | Water Cooling | Steel of Present Invention |
| B-3 | High Frequency | 150 | 50 | 55 | Air Cooling | Steel of Present Invention |
| B-4 | High Frequency | 450 | 50 | 5 | Air Cooling | Steel of Present Invention |
| B-5 | High Frequency | 350 | 50 | 10 | Air Cooling | Comparative Example |
| B-6 | High Frequency | 300 | 70 | 10 | Air Cooling | Steel of Present Invention |
| B-7 | High Frequency | 300 | 60 | 10 | Water Cooling | Steel of Present Invention |
| B-8 | High Frequency | 350 | 50 | 15 | Water Cooling | Steel of Present Invention |
| B-9 | High Frequency | 350 | 100 | 30 | Air Cooling | Steel of Present Invention |
| B-10 | High Frequency | 300 | 50 | 20 | Air Cooling | Steel of Present Invention |
| B-11 | High Frequency | 400 | 80 | 10 | Air Cooling | Comparative Example |
| B-12 | High Frequency | 400 | 70 | 10 | Air Cooling | Comparative Example |
| B-13 | High Frequency | 350 | 70 | 5 | Air Cooling | Comparative Example |
| B-14 | High Frequency | 400 | 50 | 5 | Air Cooling | Steel of Present Invention |
| B-15 | High Frequency | 350 | 50 | 5 | Air Cooling | Steel of Present Invention |
| B-16 | High Frequency | 450 | 60 | 5 | Air Cooling | Comparative Example |
| B-17 | High Frequency | 450 | 80 | 35 | Air Cooling | Steel of Present Invention |
| B-18 | High Frequency | 300 | 80 | 5 | Air Cooling | Steel of Present Invention |
| B-19 | High Frequency | 300 | 50 | 5 | Air Cooling | Comparative Example |
| B-20 | High Frequency | 300 | 100 | 35 | Air Cooling | Comparative Example |
| B-21 | High Frequency | 350 | 70 | 10 | Air Cooling | Steel of Present Invention |
| B-22 | High Frequency | 350 | 100 | 10 | Water Cooling | Steel of Present Invention |
| B-23 | High Frequency | 300 | 90 | 15 | Air Cooling | Steel of Present Invention |
| B-24 | High Frequency | 500 | 90 | 10 | Air Cooling | Steel of Present Invention |
| B-25 | High Frequency | 450 | 100 | 5 | Water Cooling | Steel of Present Invention |
| B-26 | High Frequency | 450 | 100 | 5 | Water Cooling | Comparative Example |
| B-27 | High Frequency | 450 | 100 | 5 | Water Cooling | Comparative Example |

Table 5 shows the test results for the tensile strength, martensite fraction, maximum pitting corrosion depth, corrosion fatigue resistance and sag resistance. It is understood from these results that steel sample IDs B-1 to B-4, B-6 to B-10, B-14, B-15, B-17, B-18 and B-21 to B-25, all of which satisfy the S chemical composition and the PC value of the present invention, unanimously have relatively small maximum pitting corrosion depths and good corrosion fatigue resistances. In contrast, steel sample ID B-5, which has a chemical composition within the scope of the present invention but does not have a PC value within the scope of the present invention, has a larger maximum pitting corrosion depth and poorer corrosion fatigue resistance than the steel samples of the present invention. It is also understood that steel sample IDs B-11 to B-13, B-19, B-20 and B-27, none of which have a chemical composition within the scope of the present invention, have larger maximum pitting corrosion depths and poorer corrosion fatigue resistances than the steel samples of the present invention. Further, it is understood that, when a PC value is smaller than the lower limit of the present invention as in B-16, pitting corrosion resistance and corrosion fatigue property fail to improve so much as expected and rather exhibits tensile strength beyond the scope of the present invention because content of C thereof falls outside the scope of the present invention. Yet further, in a case where the AR value is >0.35 as is the case with B-23, the steel has a large maximum pitting corrosion depth and poorer corrosion fatigue property, as compared with the rest of the samples of the present invention.

TABLE 5

| Steel sample ID | PC Value | Tensile Strength (Mpa) | Martensite Fraction (%) | Maximum Pitting Corrosion Depth (μm) | Corrosion Fatigue Property | Sag resistance | Note |
| --- | --- | --- | --- | --- | --- | --- | --- |
| A-1 | — | 2015 | 90 | 155 | 1.00 | 3.9 | Reference Steel |
| B-1 | 4.4 | 2100 | 92 | 60 | 1.48 | 2.8 | Example of Present Invention |
| B-2 | 4.4 | 2063 | 95 | 60 | 1.50 | 2.9 | Example of Present Invention |
| B-3 | 6.6 | 2130 | 92 | 95 | 1.31 | 2.5 | Example of Present Invention |
| B-4 | 4.0 | 2105 | 91 | 68 | 1.45 | 2.8 | Example of Present Invention |
| B-5 | 8.4 | 2115 | 95 | 140 | 1.07 | 2.6 | Comparative Example |
| B-6 | 3.5 | 2080 | 95 | 63 | 1.44 | 2.9 | Example of Present Invention |
| B-7 | 5.2 | 2120 | 95 | 70 | 1.42 | 2.3 | Example of Present Invention |
| B-8 | 5.7 | 2130 | 98 | 80 | 1.33 | 2.4 | Example of Present Invention |
| B-9 | 4.7 | 2060 | 97 | 66 | 1.41 | 2.8 | Example of Present Invention |
| B-10 | 5.5 | 2135 | 92 | 80 | 1.38 | 2.2 | Example of Present Invention |
| B-11 | 5.3 | 2100 | 92 | 149 | 1.02 | 2.5 | Comparative Example |
| B-12 | 5.1 | 2085 | 95 | 148 | 1.08 | 2.9 | Comparative Example |
| B-13 | 6.9 | 2077 | 93 | 153 | 1.06 | 2.8 | Comparative Example |
| B-14 | 7.4 | 2130 | 92 | 120 | 1.12 | 2.7 | Example of Present Invention |
| B-15 | 3.6 | 2083 | 91 | 70 | 1.44 | 2.7 | Example of Present Invention |
| B-16 | 3.3 | 1875 | 95 | 59 | 1.50 | 2.8 | Comparative Example |
| B-17 | 5.3 | 2102 | 99 | 74 | 1.35 | 2.5 | Example of Present Invention |
| B-18 | 6.2 | 2139 | 97 | 90 | 1.28 | 2.4 | Example of Present invention |
| B-19 | 8.0 | 2110 | 92 | 149 | 1.06 | 2.6 | Comparative Example |
| B-20 | 7.4 | 2099 | 91 | 148 | 1.07 | 2.5 | Comparative Example |
| B-21 | 4.0 | 2111 | 90 | 63 | 1.48 | 2.3 | Example of Present Invention |
| B-22 | 7.2 | 2109 | 95 | 115 | 1.15 | 2.4 | Example of Present Invention |
| B-23 | 7.9 | 2099 | 92 | 181 | 1.11 | 2.6 | Example of Present Invention |
| B-24 | 4.5 | 1937 | 94 | 88 | 1.40 | 2.9 | Example of Present Invention |
| B-25 | 6.7 | 2001 | 95 | 83 | 1.42 | 2.7 | Example of Present invention |
| B-26 | 7.5 | 2010 | 94 | 140 | 1.03 | 2.8 | Comparative Example |
| B-27 | 8.0 | 2008 | 95 | 141 | 1.03 | 2.7 | Comparative Example |

EXAMPLE 2

Steel samples having the corresponding chemical compositions shown in Table 6 were smelted in a vacuum melting furnace to produce billets from these steel samples. Each of the billets was heated to 1100° C. and then subjected to hot rolling to be finished to a round bar with a diameter of 25 mm.

Subsequently, the round bar was subjected to a normalizing process at 950° C. for one hour and then to wiredrawing to obtain a wire material sample having diameter of 15 mm. The resulting wire material sample was subjected to a quenching-tempering process with high-frequency heating under the conditions shown in Table 7. Then, the resulting wire material sample was subjected to the above-mentioned tests and evaluations.

TABLE 6

| Steel sample ID | Chemical Composition (mass %) | | | | | | | | | | | |
|---|---|---|---|---|---|---|---|---|---|---|---|---|
| | C | Si | Mn | P | S | Cr | Mo | O | N | Al | Cu | Ni |
| A-1 | 0.60 | 2.00 | 0.85 | 0.020 | 0.015 | — | — | 0.0010 | 0.003 | — | — | — |
| C-1 | 0.40 | 2.01 | 0.30 | 0.012 | 0.005 | 0.04 | 0.42 | 0.0009 | 0.007 | — | — | — |
| C-2 | 0.39 | 1.85 | 0.29 | 0.014 | 0.006 | 0.04 | 0.26 | 0.0009 | 0.009 | 0.02 | — | — |
| C-3 | 0.42 | 2.00 | 0.92 | 0.011 | 0.006 | 0.01 | 0.22 | 0.0008 | 0.007 | 0.02 | — | — |
| C-4 | 0.49 | 1.76 | 0.21 | 0.009 | 0.004 | 0.02 | 0.41 | 0.0007 | 0.019 | — | 0.73 | 1.50 |
| C-5 | 0.49 | 1.76 | 1.00 | 0.007 | 0.003 | 0.04 | 0.10 | 0.0009 | 0.008 | 0.02 | — | — |
| C-6 | 0.36 | 3.00 | 0.20 | 0.015 | 0.006 | 0.03 | 0.33 | 0.0007 | 0.007 | 0.12 | 0.21 | 0.42 |
| C-7 | 0.42 | 2.21 | 0.52 | 0.021 | 0.005 | 0.02 | 0.25 | 0.0007 | 0.007 | — | 0.92 | 1.98 |
| C-8 | 0.45 | 2.45 | 0.63 | 0.013 | 0.006 | 0.03 | 0.42 | 0.0010 | 0.009 | 0.31 | — | — |
| C-9 | 0.41 | 1.83 | 0.35 | 0.011 | 0.007 | 0.02 | 0.12 | 0.0011 | 0.007 | — | — | — |
| C-10 | 0.37 | 2.73 | 0.77 | 0.012 | 0.008 | 0.01 | 0.62 | 0.0009 | 0.007 | — | 0.25 | 0.45 |
| C-11 | 0.55 | 2.15 | 0.33 | 0.015 | 0.007 | 0.04 | 0.21 | 0.0008 | 0.007 | 0.02 | — | — |
| C-12 | 0.43 | 1.70 | 0.46 | 0.015 | 0.006 | 0.04 | 0.35 | 0.0007 | 0.007 | 0.03 | — | — |
| C-13 | 0.36 | 2.95 | 0.21 | 0.011 | 0.007 | 0.19 | 0.31 | 0.0009 | 0.008 | — | 0.21 | 0.44 |
| C-14 | 0.49 | 1.82 | 0.98 | 0.009 | 0.008 | 0.03 | 0.42 | 0.0008 | 0.015 | 0.03 | — | — |
| C-15 | 0.39 | 2.00 | 0.26 | 0.007 | 0.006 | 0.02 | 0.51 | 0.0006 | 0.013 | 0.03 | — | — |
| C-16 | 0.31 | 2.00 | 0.22 | 0.007 | 0.005 | 0.03 | 1.10 | 0.0008 | 0.014 | 0.03 | — | — |
| C-17 | 0.36 | 1.89 | 0.73 | 0.006 | 0.006 | 0.01 | 0.77 | 0.0009 | 0.007 | — | 0.15 | 0.33 |
| C-18 | 0.37 | 2.83 | 0.89 | 0.009 | 0.006 | 0.02 | 0.99 | 0.0010 | 0.008 | — | — | — |
| C-19 | 0.39 | 1.77 | 1.23 | 0.010 | 0.007 | 0.03 | 0.53 | 0.0010 | 0.008 | 0.02 | — | — |
| C-20 | 0.38 | 2.01 | 0.66 | 0.015 | 0.006 | 0.03 | 0.05 | 0.0011 | 0.009 | — | 0.11 | 0.25 |
| C-21 | 0.41 | 1.95 | 0.33 | 0.015 | 0.004 | 0.02 | 0.80 | 0.0008 | 0.011 | 0.03 | — | — |
| C-22 | 0.42 | 2.01 | 0.91 | 0.011 | 0.006 | 0.04 | 0.25 | 0.0007 | 0.012 | 0.03 | 0.30 | 0.70 |
| C-23 | 0.48 | 1.79 | 0.88 | 0.010 | 0.005 | 0.04 | 0.10 | 0.0008 | 0.007 | 0.03 | — | — |
| C-24 | 0.41 | 2.01 | 0.88 | 0.008 | 0.001 | 0.03 | 0.22 | 0.0009 | 0.005 | 0.02 | — | — |
| C-25 | 0.39 | 2.05 | 0.35 | 0.015 | 0.006 | 0.04 | 0.26 | 0.0009 | 0.008 | 0.02 | — | — |
| C-26 | 0.42 | 2.01 | 0.91 | 0.011 | 0.005 | 0.01 | 0.22 | 0.0008 | 0.025 | 0.02 | — | — |
| C-27 | 0.39 | 2.05 | 0.35 | 0.015 | 0.006 | 0.04 | 0.26 | 0.0009 | 0.008 | 0.02 | — | — |

| Steel sample ID | Chemical Composition (mass %) | | | | | PC Value*[1] | AR Value*[2] | Note |
|---|---|---|---|---|---|---|---|---|
| | W | Nb | Ti | V | B | | | |
| A-1 | — | — | — | — | — | — | — | Reference Steel |
| C-1 | — | — | — | — | — | 4.2 | 0.10 | Conforming Steel |
| C-2 | — | — | 0.015 | — | — | 4.2 | 0.15 | Conforming Steel |
| C-3 | — | — | 0.023 | — | 0.0021 | 6.5 | 0.05 | Conforming Steel |
| C-4 | — | — | 0.051 | 0.05 | — | 3.7 | 0.05 | Conforming Steel |
| C-5 | — | — | — | 0.06 | — | 8.3 | 0.40 | Comparative Steel |
| C-6 | 0.51 | — | — | — | 0.0035 | 3.4 | 0.09 | Conforming Steel |
| C-7 | 1.69 | — | 0.012 | — | 0.0048 | 4.9 | 0.08 | Conforming Steel |
| C-8 | — | 0.07 | — | — | — | 5.5 | 0.07 | Conforming Steel |
| C-9 | 0.72 | — | 0.099 | — | 0.0022 | 4.6 | 0.17 | Conforming Steel |
| C-10 | — | — | — | 0.31 | — | 5.3 | 0.02 | Conforming Steel |
| C-11 | — | — | — | — | — | 5.2 | 0.19 | Comparative Steel |
| C-12 | — | 0.02 | 0.021 | — | 0.0011 | 5.0 | 0.11 | Comparative Steel |
| C-13 | — | — | — | — | — | 6.7 | 0.61 | Comparative Steel |
| C-14 | 0.02 | 0.01 | 0.035 | 0.12 | 0.0031 | 7.1 | 0.07 | Conforming Steel |
| C-15 | — | 0.03 | 0.051 | 0.09 | 0.0022 | 3.5 | 0.04 | Conforming Steel |
| C-16 | — | 0.02 | 0.083 | 0.19 | 0.0023 | 3.0 | 0.03 | Comparative Steel |
| C-17 | — | — | 0.023 | 0.22 | 0.0021 | 5.1 | 0.01 | Conforming Steel |
| C-18 | — | — | — | — | — | 6.0 | 0.02 | Conforming Steel |
| C-19 | — | 0.01 | — | — | — | 7.8 | 0.06 | Comparative Steel |
| C-20 | — | — | 0.019 | 0.10 | 0.0025 | 7.1 | 0.60 | Comparative Steel |
| C-21 | 0.33 | — | — | — | — | 3.8 | 0.03 | Conforming Steel |
| C-22 | — | — | 0.033 | 0.11 | 0.0021 | 6.9 | 0.16 | Conforming Steel |
| C-23 | 0.25 | — | — | 0.05 | 0.0033 | 7.7 | 0.40 | Conforming Steel |
| C-24 | — | — | 0.020 | — | 0.0023 | 6.7 | 0.14 | Conforming Steel |
| C-25 | — | — | 0.015 | — | — | 4.5 | 0.15 | Conforming Steel |
| C-26 | — | — | 0.077 | — | 0.0021 | 6.3 | 0.05 | Comparative Steel |
| C-27 | — | — | 0.015 | — | 0.0022 | 4.5 | 0.15 | Conforming Steel |

*[1] PC Value = 4.2 × ([C] + [Mn]) + 0.1 × (1/[Si] + 1/[Mo]) + 20.3 × [Cr] + 0.001 × (1/ [N])
*[2] AR Value = [Cr]/ [Mo]

TABLE 7

| Steel sample ID | Ac₃ (for reference) | Quenching Process ||||||
|---|---|---|---|---|---|---|---|
| | | Heating Method | Heating Temp. (° C.) | Heating Rate (° C./s) | Retension Time (sec) | Cooling Method | Cooling Rate (° C./s) |
| A-1 | 914 | Furnace Heating | 840 | 20 | 1000 | 60° C. Oil Cooling | 30 |
| C-1 | 875 | High Frequency | 950 | 200 | 2 | Water Cooling | 50 |
| C-2 | 873 | High Frequency | 950 | 200 | 5 | Water Cooling | 30 |
| C-3 | 848 | High Frequency | 1000 | 125 | 15 | Water Cooling | 35 |
| C-4 | 816 | High Frequency | 1000 | 150 | 5 | Water Cooling | 40 |
| C-5 | 823 | High Frequency | 1000 | 125 | 10 | Water Cooling | 50 |
| C-6 | 909 | High Frequency | 1050 | 150 | 5 | Water Cooling | 50 |
| C-7 | 827 | High Frequency | 950 | 200 | 10 | Water Cooling | 40 |
| C-8 | 866 | High Frequency | 900 | 200 | 20 | Water Cooling | 40 |
| C-9 | 865 | High Frequency | 950 | 200 | 20 | Water Cooling | 35 |
| C-10 | 889 | High Frequency | 900 | 200 | 55 | Water Cooling | 50 |
| C-11 | 846 | High Frequency | 950 | 200 | 15 | Water Cooling | 50 |
| C-12 | 854 | High Frequency | 950 | 200 | 10 | Water Cooling | 40 |
| C-13 | 905 | High Frequency | 1000 | 200 | 10 | Water Cooling | 50 |
| C-14 | 829 | High Frequency | 1000 | 125 | 20 | Water Cooling | 100 |
| C-15 | 879 | High Frequency | 1050 | 200 | 25 | Water Cooling | 80 |
| C-16 | 902 | High Frequency | 1000 | 200 | 10 | Water Cooling | 50 |
| C-17 | 863 | High Frequency | 950 | 100 | 5 | Water Cooling | 70 |
| C-18 | 885 | High Frequency | 950 | 125 | 5 | Water Cooling | 60 |
| C-19 | 837 | High Frequency | 950 | 200 | 10 | Water Cooling | 60 |
| C-20 | 866 | High Frequency | 900 | 200 | 5 | Water Cooling | 50 |
| C-21 | 871 | High Frequency | 950 | 200 | 2 | Water Cooling | 50 |
| C-22 | 837 | High Frequency | 850 | 80 | 3 | Water Cooling | 100 |
| C-23 | 831 | High Frequency | 850 | 65 | 5 | Water Cooling | 100 |
| C-24 | 851 | High Frequency | 1050 | 80 | 5 | Water Cooling | 50 |
| C-25 | 878 | High Frequency | 900 | 100 | 15 | Water Cooling | 100 |
| C-26 | 849 | High Frequency | 900 | 100 | 5 | Water Cooling | 100 |
| C-27 | 878 | High Frequency | 1070 | 80 | 5 | Water Cooling | 50 |

| Steel sample ID | Tempering Process |||||  |
|---|---|---|---|---|---|---|
| | Heating Method | Heating Temp (° C.) | Heating Rate (° C./s) | Retension Time (sec) | Cooling Method | Note |
| A-1 | Furnace Heating | 510 | 20 | 3600 | Air Cooling | Reference Steel |
| C-1 | High Frequency | 300 | 100 | 5 | Air Cooling | Example of Present Invention |
| C-2 | High Frequency | 350 | 100 | 5 | Water Cooling | Example of Present Invention |
| C-3 | High Frequency | 150 | 50 | 55 | Air Cooling | Example of Present Invention |
| C-4 | High Frequency | 450 | 50 | 5 | Air Cooling | Example of Present Invention |
| C-5 | High Frequency | 350 | 50 | 10 | Air Cooling | Comparative Example |
| C-6 | High Frequency | 300 | 70 | 10 | Air Cooling | Example of Present Invention |
| C-7 | High Frequency | 300 | 60 | 10 | Water Cooling | Example of Present Invention |
| C-8 | High Frequency | 350 | 50 | 15 | Water Cooling | Example of Present Invention |
| C-9 | High Frequency | 350 | 100 | 30 | Air Cooling | Example of Present Invention |
| C-10 | High Frequency | 300 | 50 | 20 | Air Cooling | Example of Present Invention |
| C-11 | High Frequency | 400 | 80 | 10 | Air Cooling | Comparative Example |
| C-12 | High Frequency | 400 | 70 | 10 | Air Cooling | Comparative Example |
| C-13 | High Frequency | 350 | 70 | 5 | Air Cooling | Comparative Example |
| C-14 | High Frequency | 400 | 50 | 5 | Air Cooling | Example of Present Invention |
| C-15 | High Frequency | 350 | 50 | 5 | Air Cooling | Example of Present Invention |
| C-16 | High Frequency | 450 | 60 | 5 | Air Cooling | Comparative Example |
| C-17 | High Frequency | 450 | 80 | 35 | Air Cooling | Example of Present Invention |
| C-18 | High Frequency | 300 | 80 | 5 | Air Cooling | Example of Present Invention |
| C-19 | High Frequency | 300 | 50 | 5 | Air Cooling | Comparative Example |
| C-20 | High Frequency | 300 | 100 | 35 | Air Cooling | Comparative Example |
| C-21 | High Frequency | 350 | 70 | 10 | Air Cooling | Example of Present Invention |
| C-22 | High Frequency | 350 | 100 | 10 | Water Cooling | Example of Present Invention |
| C-23 | High Frequency | 300 | 90 | 15 | Air Cooling | Example of Present Invention |
| C-24 | High Frequency | 400 | 100 | 15 | Air Cooling | Example of Present Invention |
| C-25 | High Frequency | 550 | 90 | 10 | Air Cooling | Comparative Example |
| C-26 | High Frequency | 400 | 100 | 5 | Water Cooling | Comparative Example |
| C-27 | High Frequency | 450 | 100 | 15 | Air Cooling | Example of Present Invention |

Table 8 shows the test results for tensile strength, martensite fraction, maximum pitting corrosion depth, corrosion fatigue property and sag resistance. It can be seen that steel sample IDs C-1 to C-4, C-6 to C-10, C-14, C-15, C-17, C-18, C-21 to C-24 and C-27, all of which satisfy the chemical composition and the PC value of the present invention, unanimously have relatively small maximum pitting corrosion depths and good corrosion fatigue resistances, In contrast, steel sample ID C-5, which has a chemical composition within the scope of the present invention but does not have a PC value within the scope of the present invention, has a larger maximum pitting corrosion depth and poorer corrosion fatigue resistance than the steel samples of the present invention. It is also understood that steel sample IDs C-11 to C-13, C-19, C-20 and C-26, none of which have a chemical composition within the scope of the present invention, have larger maximum pitting corrosion depths and poorer corrosion fatigue resistances than the steel samples of the present invention. Further, it is understood that, when a PC value is smaller than the lower limit of the present invention as in C-16, pitting corrosion resistance and corrosion fatigue property fail to improve so much as expected and rather suffers from an increase in alloy cost because a relatively large amount of alloy elements are to be added. C-25 having tempering temperature outside the scope of the present invention has a lower tensile strength, larger maximum pitting corrosion depth and poorer corrosion fatigue property than the samples of the present invention. Yet further, in a case where the AR value is >0.35 as in C-23, the steel has a large maximum pitting corrosion depth and poorer corrosion fatigue property, as compared with the rest of the samples of the present invention.

TABLE 8

| Steel sample ID | PC Value | Tensile Strength (MPa) | Martensite Fraction (%) | Maximum Pitting Corrosion Depth (μm) | Corrosion Fatigue Property | Setting Property | Note |
|---|---|---|---|---|---|---|---|
| A-1 | — | 2015 | 90 | 155 | 1.00 | 3.9 | Reference Steel |
| C-1 | 4.2 | 2100 | 92 | 60 | 1.48 | 2.7 | Example of Present Invention |
| C-2 | 4.2 | 2063 | 95 | 60 | 1.50 | 2.9 | Example of Present Invention |
| C-3 | 6.5 | 2130 | 92 | 95 | 1.31 | 2.5 | Example of Present Invention |
| C-4 | 3.7 | 2105 | 91 | 63 | 1.45 | 2.8 | Example of Present Invention |
| C-5 | 8.3 | 2115 | 95 | 140 | 1.07 | 2.6 | Comparative Example |
| C-6 | 3.4 | 2080 | 95 | 63 | 1.44 | 2.8 | Example of Present Invention |
| C-7 | 4.9 | 2120 | 95 | 70 | 1.42 | 2.3 | Example of Present Invention |
| C-8 | 5.5 | 2130 | 98 | 80 | 1.33 | 2.5 | Example of Present Invention |
| C-9 | 4.6 | 2060 | 97 | 66 | 1.41 | 2.8 | Example of Present Invention |
| C-10 | 5.3 | 2135 | 92 | 80 | 1.38 | 2.2 | Example of Present Invention |
| C-11 | 5.2 | 2100 | 92 | 149 | 1.02 | 2.5 | Comparative Example |
| C-12 | 5.0 | 2085 | 95 | 148 | 1.08 | 2.8 | Comparative Example |
| C-13 | 6.7 | 2077 | 93 | 153 | 1.06 | 2.8 | Comparative Example |
| C-14 | 7.1 | 2130 | 92 | 120 | 1.12 | 2.7 | Example of Present Invention |
| C-15 | 3.5 | 2083 | 91 | 70 | 1.44 | 2.6 | Example of Present Invention |
| C-16 | 3.0 | 1865 | 95 | 59 | 1.50 | 2.8 | Comparative Example |
| C-17 | 5.1 | 2102 | 99 | 74 | 1.35 | 2.5 | Example of Present invention |
| C-18 | 6.0 | 2139 | 97 | 90 | 1.28 | 2.4 | Example of Present Invention |
| C-19 | 7.8 | 2110 | 92 | 149 | 1.06 | 2.6 | Comparative Example |
| C-20 | 7.1 | 2099 | 91 | 148 | 1.07 | 2.5 | Comparative Example |
| C-21 | 8.8 | 2111 | 90 | 63 | 1.48 | 2.3 | Example of Present Invention |
| C-22 | 6.9 | 2109 | 95 | 115 | 1.15 | 2.4 | Example of Present Invention |
| C-23 | 7.7 | 2099 | 92 | 131 | 1.11 | 2.6 | Example of Present Invention |
| C-24 | 6.7 | 1999 | 94 | 83 | 1.41 | 2.8 | Example of Present Invention |
| C-25 | 4.5 | 1785 | 93 | 159 | 0.85 | 3.0 | Comparative Example |
| C-26 | 6.3 | 2077 | 95 | 178 | 0.77 | 2.9 | Comparative Example |
| C-27 | 4.5 | 1985 | 92 | 90 | 1.27 | 2.9 | Example of Present Invention |

EXAMPLE 3

Steel samples having the corresponding chemical compositions shown in Table 9 were smelted in a vacuum melting furnace to produce billets from these steel samples. Each of the billets was heated to 1100° C. and then subjected to hot rolling to be finished to a round bar with a diameter of 25 mm. Subsequently, the round bar was subjected to a normalizing process at 950° C. for one hour and then to wiredrawing to obtain a wire material sample having diameter of 15 mm. The resulting wire material sample was subjected to heating in an electric furnace (this process will be referred to as "furnace beating" hereinafter) under the conditions shown in Table 10 and subsequent quenching-tempering process. The resulting wire material sample was then subjected to the above-mentioned tests and evaluations.

TABLE 9

| Steel sample ID | Chemical Composition (mass %) | | | | | | | | | | |
|---|---|---|---|---|---|---|---|---|---|---|---|
| | C | Si | Mn | P | S | Cr | Mo | O | N | Al | Cu |
| A-1 | 0.60 | 2.00 | 0.85 | 0.020 | 0.015 | — | — | 0.0010 | 0.003 | — | — |
| D-1 | 0.40 | 2.01 | 0.30 | 0.012 | 0.005 | 0.04 | 0.42 | 0.0009 | 0.007 | — | — |
| D-2 | 0.39 | 1.85 | 0.29 | 0.014 | 0.006 | 0.04 | 0.26 | 0.0009 | 0.009 | 0.02 | — |
| D-3 | 0.42 | 2.00 | 0.92 | 0.011 | 0.006 | 0.01 | 0.22 | 0.0008 | 0.007 | 0.22 | — |
| D-4 | 0.49 | 1.76 | 0.21 | 0.009 | 0.004 | 0.02 | 0.41 | 0.0007 | 0.019 | — | 0.73 |
| D-5 | 0.49 | 1.76 | 1.00 | 0.007 | 0.003 | 0.04 | 0.10 | 0.0009 | 0.008 | 0.02 | — |
| D-6 | 0.36 | 3.00 | 0.20 | 0.015 | 0.006 | 0.03 | 0.33 | 0.0007 | 0.007 | 0.12 | 0.21 |
| D-7 | 0.42 | 2.21 | 0.52 | 0.021 | 0.005 | 0.02 | 0.25 | 0.0007 | 0.007 | — | 0.92 |
| D-8 | 0.45 | 2.45 | 0.63 | 0.013 | 0.006 | 0.03 | 0.42 | 0.0010 | 0.009 | 0.31 | — |
| D-9 | 0.41 | 1.83 | 0.35 | 0.011 | 0.007 | 0.02 | 0.12 | 0.0011 | 0.007 | — | — |
| D-10 | 0.37 | 2.73 | 0.77 | 0.012 | 0.008 | 0.01 | 0.62 | 0.0009 | 0.007 | — | 0.25 |
| D-11 | 0.55 | 2.15 | 0.33 | 0.015 | 0.007 | 0.04 | 0.21 | 0.0008 | 0.004 | 0.02 | — |
| D-12 | 0.43 | 1.70 | 0.46 | 0.015 | 0.006 | 0.04 | 0.35 | 0.0007 | 0.004 | 0.03 | — |
| D-13 | 0.36 | 2.95 | 0.21 | 0.011 | 0.007 | 0.19 | 0.31 | 0.0009 | 0.004 | — | 0.21 |
| D-14 | 0.49 | 1.82 | 0.98 | 0.009 | 0.008 | 0.03 | 0.42 | 0.0008 | 0.003 | 0.03 | — |
| D-15 | 0.38 | 2.00 | 0.26 | 0.007 | 0.005 | 0.02 | 0.51 | 0.0006 | 0.004 | 0.03 | — |
| D-16 | 0.31 | 2.00 | 0.22 | 0.007 | 0.005 | 0.03 | 0.50 | 0.0008 | 0.004 | 0.03 | — |
| D-17 | 0.37 | 1.89 | 0.73 | 0.006 | 0.005 | 0.01 | 0.77 | 0.0009 | 0.004 | — | 0.15 |
| D-18 | 0.38 | 2.82 | 0.88 | 0.009 | 0.006 | 0.02 | 0.99 | 0.0010 | 0.003 | — | — |
| D-19 | 0.41 | 2.15 | 1.23 | 0.010 | 0.007 | 0.03 | 0.33 | 0.0010 | 0.005 | 0.02 | — |
| D-20 | 0.38 | 2.01 | 0.66 | 0.015 | 0.006 | 0.03 | 0.05 | 0.0011 | 0.003 | — | 0.11 |
| D-21 | 0.42 | 1.95 | 0.33 | 0.015 | 0.004 | 0.02 | 0.80 | 0.0008 | 0.004 | 0.03 | — |
| D-22 | 0.42 | 2.01 | 0.91 | 0.011 | 0.006 | 0.04 | 0.25 | 0.0007 | 0.003 | 0.03 | 0.30 |
| D-23 | 0.49 | 1.78 | 0.88 | 0.010 | 0.005 | 0.04 | 0.10 | 0.0008 | 0.004 | 0.03 | — |
| D-24 | 0.42 | 2.00 | 0.92 | 0.011 | 0.006 | 0.01 | 0.22 | 0.0008 | 0.007 | 0.02 | — |
| D-25 | 0.42 | 1.98 | 0.89 | 0.007 | 0.003 | 0.02 | 0.21 | 0.0007 | 0.004 | 0.02 | — |
| D-26 | 0.45 | 2.45 | 0.63 | 0.013 | 0.006 | 0.03 | 0.42 | 0.0010 | 0.009 | 0.31 | — |
| D-27 | 0.41 | 1.83 | 0.35 | 0.011 | 0.007 | 0.02 | 0.12 | 0.0011 | 0.007 | — | — |
| D-28 | 0.37 | 2.73 | 0.77 | 0.012 | 0.008 | 0.01 | 0.62 | 0.0009 | 0.007 | — | 0.25 |
| D-29 | 0.42 | 1.98 | 0.89 | 0.007 | 0.003 | 0.02 | 0.21 | 0.0007 | 0.004 | 0.02 | — |
| D-20 | 0.42 | 1.98 | 0.89 | 0.007 | 0.003 | 0.02 | 0.21 | 0.0007 | 0.004 | 0.02 | — |
| D-31 | 0.42 | 1.98 | 0.89 | 0.007 | 0.003 | 0.02 | 0.21 | 0.0007 | 0.004 | 0.02 | — |

| Steel sample ID | Chemical Composition (mass %) | | | | | | PC Value*[1] | AR Value*[2] | Note |
|---|---|---|---|---|---|---|---|---|---|
| | Ni | W | Nb | Ti | V | B | | | |
| A-1 | — | — | — | — | — | — | — | — | Reference Steel |
| D-1 | — | — | — | — | — | — | 4.2 | 0.10 | Conforming Steel |
| D-2 | — | — | — | 0.015 | — | — | 4.2 | 0.15 | Conforming Steel |
| D-3 | — | — | — | 0.023 | — | 0.0021 | 6.5 | 0.05 | Conforming Steel |
| D-4 | 1.50 | — | — | 0.051 | 0.05 | — | 3.7 | 0.05 | Conforming Steel |
| D-5 | — | — | — | — | 0.06 | — | 8.3 | 0.40 | Comparative Steel |
| D-6 | 0.42 | 0.51 | — | — | — | 0.0035 | 3.4 | 0.09 | Conforming Steel |
| D-7 | 1.98 | 1.69 | — | 0.012 | — | 0.0048 | 4.9 | 0.08 | Conforming Steel |
| D-8 | — | — | 0.07 | — | — | — | 5.5 | 0.07 | Conforming Steel |
| D-9 | — | 0.72 | — | 0.099 | — | 0.0022 | 4.6 | 0.17 | Conforming Steel |
| D-10 | 0.45 | — | — | — | 0.31 | — | 5.3 | 0.02 | Conforming Steel |
| D-11 | — | — | — | — | — | — | 5.3 | 0.19 | Comparative Steel |
| D-12 | — | — | 0.02 | 0.021 | — | 0.0011 | 5.1 | 0.11 | Comparative Steel |
| D-13 | 0.44 | — | — | — | — | — | 6.9 | 0.61 | Comparative Steel |
| D-14 | — | 0.22 | 0.01 | 0.035 | 0.12 | 0.0031 | 7.4 | 0.07 | Conforming Steel |
| D-15 | — | — | 0.03 | 0.051 | 0.09 | 0.0022 | 3.6 | 0.04 | Conforming Steel |
| D-16 | — | — | 0.02 | 0.083 | 0.19 | 0.0023 | 3.3 | 0.06 | Comparative Steel |
| D-17 | 0.33 | — | — | 0.023 | 0.22 | 0.0021 | 5.3 | 0.01 | Conforming Steel |
| D-18 | — | — | — | — | — | — | 6.2 | 0.02 | Conforming Steel |
| D-19 | — | — | 0.01 | — | — | — | 8.0 | 0.09 | Comparative Steel |
| D-20 | 0.25 | — | — | 0.019 | 0.10 | 0.0025 | 7.4 | 0.60 | Comparative Steel |
| D-21 | — | 0.33 | — | — | — | — | 4.0 | 0.03 | Conforming Steel |
| D-22 | 0.70 | — | — | 0.033 | 0.11 | 0.0021 | 7.2 | 0.16 | Conforming Steel |
| D-23 | — | 0.25 | — | — | 0.05 | 0.0033 | 7.9 | 0.40 | Conforming Steel |
| D-24 | — | — | — | 0.018 | — | 0.0021 | 6.5 | 0.05 | Conforming Steel |
| D-25 | — | — | — | 0.021 | — | 0.0022 | 6.7 | 0.10 | Conforming Steel |
| D-26 | — | — | 0.07 | — | — | — | 5.5 | 0.07 | Conforming Steel |

TABLE 9-continued

| | | | | | | | | | |
|---|---|---|---|---|---|---|---|---|---|
| D-27 | — | 0.72 | — | 0.099 | — | 0.0022 | 4.6 | 0.17 | Conforming Steel |
| D-28 | 0.45 | — | — | — | 0.31 | — | 5.3 | 0.02 | Conforming Steel |
| D-29 | — | — | — | 0.021 | — | 0.0022 | 6.7 | 0.10 | Conforming Steel |
| D-20 | — | — | — | 0.021 | — | 0.0022 | 6.7 | 0.10 | Conforming Steel |
| D-31 | — | — | — | 0.021 | — | 0.0022 | 6.7 | 0.10 | Conforming Steel |

*[1] PC Value = 4.2 × ([C] + [Mn]) + 0.1 × (1/[Si] + 1/[Mo]) + 20.3 × [Cr] + 0.001 × (1/[N])
*[2] AR Value = [Cr]/[Mo]

TABLE 10

| Steel sample ID | $Ac_3$ (for reference) | Quenching Process | | | | |
|---|---|---|---|---|---|---|
| | | Heating Method | Heating Temp (° C.) | Heating Rate (° C./s) | Cooling Method | Cooling Rate (° C./s) |
| A-1 | 814 | Furnace Heating | 840 | 20 | Oil Cooling | 30 |
| D-1 | 875 | Furnace Heating | 950 | 10 | Water Cooling | 25 |
| D-2 | 873 | Furnace Heating | 950 | 10 | Water Cooling | 30 |
| D-3 | 848 | Furnace Heating | 970 | 7 | Water Cooling | 30 |
| D-4 | 816 | Furnace Heating | 1000 | 5 | Water Cooling | 35 |
| D-5 | 823 | Furnace Heating | 1000 | 5 | Water Cooling | 20 |
| D-6 | 909 | Furnace Heating | 1050 | 5 | Water Cooling | 25 |
| D-7 | 827 | Furnace Heating | 950 | 10 | Water Cooling | 30 |
| D-8 | 866 | Furnace Heating | 900 | 15 | Water Cooling | 20 |
| D-9 | 865 | Furnace Heating | 950 | 10 | Water Cooling | 25 |
| D-10 | 889 | Furnace Heating | 900 | 15 | Water Cooling | 30 |
| D-11 | 846 | Furnace Heating | 950 | 10 | Water Cooling | 25 |
| D-12 | 854 | Furnace Heating | 950 | 10 | Water Cooling | 30 |
| D-13 | 905 | Furnace Heating | 1000 | 5 | Water Cooling | 30 |
| D-14 | 829 | Furnace Heating | 1000 | 5 | Water Cooling | 25 |
| D-15 | 882 | Furnace Heating | 1050 | 5 | Water Cooling | 20 |
| D-16 | 902 | Furnace Heating | 1000 | 5 | Water Cooling | 20 |
| D-17 | 861 | Furnace Heating | 950 | 10 | Oil Cooling | 20 |
| D-18 | 883 | Furnace Heating | 950 | 10 | Water Cooling | 25 |
| D-19 | 844 | Furnace Heating | 950 | 10 | Water Cooling | 20 |
| D-20 | 866 | Furnace Heating | 900 | 15 | Water Cooling | 20 |
| D-21 | 869 | Furnace Heating | 950 | 10 | Water Cooling | 25 |
| D-22 | 837 | Furnace Heating | 850 | 20 | Water Cooling | 20 |
| D-23 | 829 | Furnace Heating | 850 | 20 | Water Cooling | 30 |
| D-24 | 848 | Furnace Heating | 970 | 7 | Oil Cooling | 20 |
| D-25 | 847 | Furnace Heating | 1040 | 5 | Oil Cooling | 15 |
| D-26 | 866 | Furnace Heating | 900 | 15 | Oil Cooling | 15 |
| D-27 | 865 | Furnace Heating | 950 | 10 | Oil Cooling | 10 |
| D-28 | 889 | Furnace Heating | 900 | 15 | Oil Cooling | 20 |
| D-29 | 847 | Furnace Heating | 1040 | 5 | Oil Cooling | 20 |
| D-30 | 847 | Furnace Heating | 1040 | 5 | Oil Cooling | 15 |
| D-31 | 847 | Furnace Heating | 1040 | 5 | Oil Cooling | 10 |

| Steel sample ID | Tempering Process | | | | Note |
|---|---|---|---|---|---|
| | Heating Method | Heating Temp. (° C.) | Heating Rate (° C./s) | Cooling Method | |
| A-1 | Furnace Heating | 510 | 20 | Air Cooling | Reference Steel |
| D-1 | Furnace Heating | 300 | 7 | Air Cooling | Example of Present Invention |
| D-2 | Furnace Heating | 350 | 7 | Water Cooling | Example of Present Invention |
| D-3 | Furnace Heating | 400 | 6 | Air Cooling | Example of Present Invention |
| D-4 | Furnace Heating | 450 | 10 | Air Cooling | Example of Present Invention |
| D-5 | Furnace Heating | 350 | 10 | Air Cooling | Comparative Example |
| D-6 | Furnace Heating | 300 | 20 | Air Cooling | Example of Present Invention |
| D-7 | Furnace Heating | 300 | 20 | Water Cooling | Example of Present Invention |
| D-8 | Furnace Heating | 350 | 15 | Water Cooling | Example of Present Invention |
| D-9 | Furnace Heating | 350 | 20 | Air Cooling | Example of Present Invention |
| D-10 | Furnace Heating | 300 | 10 | Air Cooling | Example of Present Invention |
| D-11 | Furnace Heating | 400 | 10 | Air Cooling | Comparative Example |
| D-12 | Furnace Heating | 400 | 15 | Air Cooling | Comparative Example |
| D-13 | Furnace Heating | 350 | 15 | Air Cooling | Comparative Example |
| D-14 | Furnace Heating | 400 | 7 | Air Cooling | Example of Present Invention |
| D-15 | Furnace Heating | 350 | 7 | Air Cooling | Example of Present Invention |
| D-16 | Furnace Heating | 450 | 10 | Air Cooling | Comparative Example |
| D-17 | Furnace Heating | 450 | 10 | Air Cooling | Example of Present Invention |
| D-18 | Furnace Heating | 300 | 20 | Air Cooling | Example of Present Invention |
| D-19 | Furnace Heating | 300 | 15 | Air Cooling | Comparative Example |
| D-20 | Furnace Heating | 300 | 15 | Air Cooling | Comparative Example |
| D-21 | Furnace Heating | 350 | 20 | Air Cooling | Example of Present Invention |

TABLE 10-continued

| | | | | | |
|---|---|---|---|---|---|
| D-22 | Furnace Heating | 350 | 10 | Water Cooling | Example of Present Invention |
| D-23 | Furnace Heating | 300 | 15 | Air Cooling | Example of Present Invention |
| D-24 | Furnace Heating | 400 | 15 | Oil Cooling | Example of Present Invention |
| D-25 | Furnace Heating | 400 | 15 | Air Cooling | Example of Present Invention |
| D-26 | Furnace Heating | 350 | 20 | Air Cooling | Example of Present Invention |
| D-27 | Furnace Heating | 450 | 20 | Water Cooling | Example of Present Invention |
| D-28 | Furnace Heating | 350 | 15 | Oil Cooling | Example of Present Invention |
| D-29 | Furnace Heating | 450 | 15 | Water Cooling | Example of Present Invention |
| D-30 | Furnace Heating | 550 | 7 | Oil Cooling | Comparative Example |
| D-31 | Furnace Heating | 400 | 10 | Air Cooling | Example of Present Invention |

Table 11 shows the test results for the tensile strength, martensite fraction, maximum pitting corrosion depth, corrosion fatigue property and sag resistance. It can be seen that steel sample IDs D-1 to D-4, D-6 to D-10, D-14, D-15, D-17, D-18 and D-21 to D-29, all of which satisfy the chemical composition and the PC value of the present invention, unanimously have relatively small maximum pitting corrosion depths and good corrosion fatigue resistances. In contrast, steel sample ID D-5, which has a chemical composition within the scope of the present invention but does not have a PC value within the scope of the present invention, has a larger maximum pitting corrosion depth and poorer corrosion fatigue resistance than the steel samples of the present invention. It is also understood that steel sample IDs D-11 to D-13, D-19 and D-20, none of which have a chemical composition within the scope of the present invention, have larger maximum pitting corrosion depths and poorer corrosion fatigue resistances than the steel samples of the present invention. Further, it is understood that, when a PC value is smaller than the lower limit of the present invention as in D-16, pitting corrosion resistance and corrosion fatigue property fail to improve so much as expected and rather suffers from an increase in alloy cost because a relatively large amount of alloy elements are to be added. D-30 having tempering temperature outside the scope of the present invention has a lower tensile strength, larger maximum pitting corrosion depth and poorer corrosion fatigue property than the samples of the present invention. Yet further, in a case where the AR value is >0.35 as in D-23, the steel has a large maximum pitting corrosion depth and poorer corrosion fatigue property, as compared with the rest of the samples of the present invention.

TABLE 11

| Steel sample ID | PC Value | Tensile Strength (MPa) | Martensite Fraction (%) | Maximum Pitting Corrosion Depth (μm) | Corrosion Fatigue Property | Setting Property | Note |
|---|---|---|---|---|---|---|---|
| A-1 | — | 2015 | 90 | 155 | 1.00 | 3.9 | Reference Steel |
| D-1 | 4.2 | 2095 | 92 | 60 | 1.48 | 2.7 | Example of Present Invention |
| D-2 | 4.2 | 2065 | 94 | 62 | 1.50 | 2.9 | Example of Present invention |
| D-3 | 6.5 | 2015 | 93 | 89 | 1.29 | 2.9 | Example of Present Invention |
| D-4 | 3.7 | 2083 | 92 | 66 | 1.45 | 2.8 | Example of Present Invention |
| D-5 | 8.3 | 2115 | 95 | 139 | 1.07 | 2.6 | Comparative Example |
| D-6 | 8.4 | 2035 | 94 | 63 | 1.44 | 2.8 | Example of Present Invention |
| D-7 | 4.9 | 2113 | 94 | 72 | 1.42 | 2.8 | Example of Present Invention |
| D-8 | 5.5 | 2105 | 93 | 79 | 1.33 | 2.5 | Example of Present Invention |
| D-9 | 4.6 | 2060 | 98 | 65 | 1.41 | 2.8 | Example of Present Invention |
| D-10 | 5.3 | 2097 | 93 | 83 | 1.38 | 2.2 | Example of Present Invention |
| D-11 | 5.0 | 2094 | 92 | 149 | 1.02 | 2.5 | Comparative Example |
| D-12 | 4.9 | 2025 | 95 | 147 | 1.08 | 2.9 | Comparative Example |
| D-13 | 6.6 | 2026 | 93 | 155 | 1.06 | 2.8 | Comparative Example |
| D-14 | 7.1 | 2115 | 91 | 110 | 1.12 | 2.7 | Example of Present Invention |
| D-15 | 3.3 | 2080 | 93 | 73 | 1.44 | 2.7 | Example of Prevent Invention |
| D-16 | 3.1 | 1871 | 95 | 59 | 1.50 | 2.8 | Comparative Example |
| D-17 | 5.0 | 2099 | 99 | 77 | 1.85 | 2.5 | Example of Present Invention |
| D-18 | 5.8 | 2137 | 98 | 92 | 1.28 | 2.4 | Example of Present Invention |
| D-19 | 7.8 | 2105 | 93 | 159 | 1.06 | 2.6 | Comparative Example |
| D-20 | 7.0 | 2083 | 91 | 147 | 1.07 | 2.5 | Comparative Example |
| D-21 | 3.7 | 2101 | 90 | 62 | 1.48 | 2.3 | Example of Present Invention |
| D-22 | 6.8 | 2099 | 93 | 121 | 1.15 | 2.4 | Example of Present Invention |
| D-23 | 7.6 | 2087 | 93 | 133 | 1.11 | 2.6 | Example of Present Invention |
| D-24 | 6.5 | 2017 | 93 | 87 | 1.31 | 2.8 | Example of Present invention |
| D-25 | 6.7 | 2009 | 93 | 89 | 1.30 | 2.9 | Example of Present Invention |
| D-26 | 5.5 | 2082 | 96 | 99 | 1.33 | 2.5 | Example of Present Invention |
| D-27 | 4.6 | 1998 | 92 | 95 | 1.39 | 2.9 | Example of Present Invention |
| D-28 | 5.3 | 1979 | 91 | 83 | 1.36 | 2.9 | Exempla of Present Invention |
| D-29 | 6.7 | 1981 | 95 | 88 | 1.30 | 2.7 | Example of Present Invention |
| D-30 | 6.7 | 1790 | 93 | 150 | 1.06 | 3.0 | Comparative Example |
| D-31 | 6.7 | 1993 | 95 | 87 | 1.31 | 2.8 | Example of Present Invention |

INDUSTRIAL APPLICABILITY

According to the present invention, it is possible to manufacture high strength spring steel in a stable manner such that the spring steel possesses much better pitting corrosion resistance and corrosion fatigue property than the conventional high strength spring steel. Moreover, the present invention makes a contribution to reducing weight of automobiles, thereby causing an industrially beneficial effect.

What is claimed is:

1. Spring steel comprising:
a chemical composition including,
C: greater than 0.35 mass % and less than 0.50 mass %,
Si: greater than 1.75 mass % and equal to or less than 3.00 mass %,
Mn: 0.2 mass % to 1.0 mass % (inclusive of 0.2 mass % and 1.0 mass %),
Cr: 0.01 mass % to 0.04 mass % (inclusive of 0.01 mass % and 0.04 mass %),
P: 0.025 mass % or less,
S: 0.025 mass % or less,
Mo: 0.1 mass % to 1.0 mass % (inclusive of 0.1 mass % and 1.0 mass %),
O: 0.0015 mass % or less, and
the balance as incidental impurities and Fe; and
microstructure with martensite fraction of 90% or more,
wherein a PC value calculated by Formula (1) below is greater than 3.3 and equal to or less than 8.0, and the spring steel has tensile strength of 1900 MPa or more, $$PC=4.2\times([C]+[Mn])+0.1\times(1/[Si]+1/[Mo])+20.3\times[Cr]+0.001\times(1/[N]) \quad \text{Formula (1)}$$

wherein [brackets] denote the content of an element in the brackets (in mass %).

2. The spring steel according to claim 1, wherein the chemical composition further satisfies Formula (2) below:

$$[Cr]/[Mo]\leq 0.35 \quad \text{Formula (2)}$$

wherein [brackets] denote the content of an element in the brackets (in mass %).

3. The spring steel according to claim 1, wherein the chemical composition further contains at least one element selected from:
Al: 0.01 mass % to 0.50 mass % (inclusive of 0.01 mass % and 0.50 mass %);
Cu: 0.005 mass % to 1.0 mass % (inclusive of 0.005 mass % and 1.0 mass %); and
Ni: 0.005 mass % to 2.0 mass % (inclusive of 0.005 mass % and 2.0 mass %).

4. The spring steel according to claim 1, wherein the chemical composition further contains at least one element selected from:
W: 0.001 mass % to 2.0 mass % (inclusive of 0.001 mass % and 2.0 mass %);
Nb: 0.001 mass % to 0.1 mass % (inclusive of 0.001 mass % and 0.1 mass %);
Ti: 0.001 mass % to 0.2 mass % (inclusive of 0.001 mass % and 0.2 mass %); and
V: 0.002 mass % to 0.5 mass % (inclusive of 0.002 mass % and 0.5 mass %).

5. The spring steel according to claim 1, wherein the chemical composition further contains:
B: 0.0002 mass % to 0.005 mass % (inclusive of 0.0002 mass % and 0.005 mass %).

6. The spring steel according to claim 1, wherein the chemical composition further contains:
N: 0.005 mass % to 0.020 mass % (inclusive of 0.005 mass % and 0.020 mass %).

7. A method for manufacturing spring steel, comprising:
heating a steel material to temperature in the range of $Ac_3$ point to ($Ac_3$ point+200° C.) (inclusive of $Ac_3$ point and ($Ac_3$ point+200° C.));
cooling the steel material to 200° C. or lower at a cooling rate of 10° C/sec or higher; and
thereafter heating the steel material to temperature in the range of 150° C. and 500° C. (inclusive of 150° C. and 500° C.) and then cooling,
wherein the steel material has a chemical composition including,
C: greater than 0.35 mass % and less than 0.50 mass %,
Si: greater than 1.75 mass % and equal to or less than 3.00 mass %,
Mn: 0.2 mass % to 1.0 mass % (inclusive of 0.2 mass % and 1.0 mass %),
Cr: 0.01 mass % to 0.04 mass % (inclusive of 0.01 mass % and 0.04 mass %),
P: 0.025 mass % or less,
S: 0.025 mass % or less,
Mo: 0.1 mass % to 1.0 mass % (inclusive of 0.1 mass % and 1.0 mass %),
O: 0.0015 mass % or less, and
the balance as incidental impurities and Fe, and
a PC value calculated by Formula (1) below is greater than 3.3 and equal to or less than 8.0, $$PC=4.2\times([C]+[Mn])+0.1\times(1/[Si]+1/[Mo])+20.3\times[Cr]+0.001\times(1/[N]) \quad \text{Formula (1)}$$

wherein [brackets] denote the content of an element in the brackets (in mass %).

8. The method for manufacturing spring steel according to claim 7, wherein the chemical composition further satisfies Formula (2) below:

$$[Cr]/[Mo]\leq 0.35 \quad \text{Formula (2)}$$

wherein [brackets] denote the content of an element in the brackets (in mass %).

9. The method for manufacturing spring steel according to claim 7 the chemical composition further contains at least one type of element selected from:
Al: 0.01 mass % to 0.50 mass % (inclusive of 0.01 mass % and 0.50 mass %);
Cu: 0.005 mass % to 1.0 mass % (inclusive of 0.005 mass % and 1.0 mass %); and
Ni: 0.005 mass % to 2.0 mass % (inclusive of 0.005 mass % and 2.0 mass %).

10. The method for manufacturing spring steel according to of claim 7, wherein the chemical composition further contains at least one type of element selected from:
W: 0.001 mass % to 2.0 mass % (inclusive of 0.001 mass % and 2.0 mass %);
Nb: 0.001 mass % to 0.1 mass % (inclusive of 0.001 mass % and 0.1 mass %);
Ti: 0.001 mass % to 0.2 mass % (inclusive of 0.001 mass % and 0.2 mass %); and
V: 0.002 mass % to 0.5 mass % (inclusive of 0.002 mass % and 0.5 mass %).

11. The method for manufacturing spring steel according to claim 7, wherein the chemical composition further contains:
B: 0.0002 mass % to 0.005 mass % (inclusive of 0.0002 mass % and 0.005 mass %).

12. The method for manufacturing spring steel according to claim 7, wherein the chemical composition further contains:
N: 0.005 mass % to 0.020 mass % (inclusive of 0.005 mass % and 0.020 mass %).

* * * * *